US006776480B2

(12) United States Patent
Perrott et al.

(10) Patent No.: US 6,776,480 B2
(45) Date of Patent: Aug. 17, 2004

(54) SPECTACLE FRAMES FOR SHAPED LENSES DEFINED BY MONOFORMAL CARRIER SURFACES

(75) Inventors: Colin Maurice Perrott, Port Ludlow, WA (US); Michael Alan Morris, Santa Rosa, CA (US)

(73) Assignee: Sola International Holdings, Ltd., Lonsdale (AU)

( * ) Notice: Subject to any disclaimer, the term of this patent is extended or adjusted under 35 U.S.C. 154(b) by 0 days.

(21) Appl. No.: 10/340,674

(22) Filed: Jan. 13, 2003

(65) Prior Publication Data

US 2003/0169398 A1 Sep. 11, 2003

Related U.S. Application Data

(63) Continuation-in-part of application No. 09/830,050, filed as application No. PCT/AU98/00872 on Oct. 21, 1998, now Pat. No. 6,505,930.

(51) Int. Cl.⁷ ................................................ G02C 1/00
(52) U.S. Cl. ........................ 351/41; 351/83; 351/159
(58) Field of Search ............................ 351/41, 83, 159, 351/178

(56) References Cited

U.S. PATENT DOCUMENTS

| | | |
|---|---|---|
| 1,741,536 A | 12/1929 | Rayton |
| 1,918,999 A | 7/1933 | Wells |
| 1,942,400 A | 1/1934 | Glancy |
| 4,547,049 A * | 10/1985 | Cotie ......................... 351/159 |
| 4,577,942 A | 3/1986 | Frieder et al. |
| 4,778,266 A | 10/1988 | Maitenaz |
| 4,859,048 A | 8/1989 | Jannard |
| 4,867,550 A | 9/1989 | Jannard |
| 5,094,520 A | 3/1992 | Reshef et al. |
| 5,426,473 A | 6/1995 | Riehm |
| 5,483,303 A | 1/1996 | Hirschman |
| 5,541,674 A | 7/1996 | Jannard |
| 5,604,547 A | 2/1997 | Davis et al. |
| 5,689,323 A | 11/1997 | Houston et al. |
| 5,719,655 A | 2/1998 | Peschel et al. |
| 5,764,332 A | 6/1998 | Kranhouse |
| 5,774,201 A | 6/1998 | Tackles |
| 5,805,261 A | 9/1998 | Houston et al. |
| 5,825,455 A | 10/1998 | Fecteau et al. |
| 6,142,624 A | 11/2000 | Morris et al. |
| 6,334,681 B1 | 1/2002 | Perrott et al. |
| 6,361,166 B1 | 3/2002 | Perrott et al. |
| 6,454,408 B1 * | 9/2002 | Morris et al. ............... 351/159 |

FOREIGN PATENT DOCUMENTS

| | | |
|---|---|---|
| FR | 1 509 090 | 1/1968 |
| FR | 2 542 462 | 9/1984 |
| GB | 680 400 | 10/1952 |
| GB | 1 509 583 | 7/1975 |
| WO | WO 79/00548 | 8/1979 |
| WO | WO 91/17468 | 11/1991 |
| WO | WO 97/21138 | 6/1997 |
| WO | WO 99/63392 | 12/1999 |
| WO | WO 00/23021 | 4/2000 |

OTHER PUBLICATIONS

M. Jalie; The Principles of Ophthalmic Lenses; Jan. 1972; pp. 1–29; Chapter 4, pp. 30–33; pp. 462–469; and pp. 151 & 152.; Fourth Edition; The Association of British Dispensing Opticians, London England.

* cited by examiner

*Primary Examiner*—Huy Mai
(74) *Attorney, Agent, or Firm*—Burns, Doane, Swecker & Mathis, LLP

(57) ABSTRACT

Spectacles, frames and methods for providing the same are disclosed. The frames have a shape adapted for engagement of wrap-around lenses having significant changes in base curvature in the field of vision of the wearer.

16 Claims, 17 Drawing Sheets

SPECTACLE FRAMES FOR SHAPED LENSES DEFINED BY MONOFORMAL CARRIER SURFACES

RELATED APPLICATIONS

This application is a continuation in part of U.S. application Ser. No. 09/830,050 filed Jul. 18, 2001 now U.S. Pat. No. 6,505,930, which is the national phase filing of PCT/AU98/00872 filed on Oct. 21, 1998, the contents of which prior application is hereby incorporated by reference in its entirety.

FIELD OF THE INVENTION

The present application relates to spectacles, spectacle frames and methods for providing spectacles of the wrap-around type, and, in particular, to frames adapted to receive optical lenses characterized by contour fitting with changes in base curvature across the lens.

BACKGROUND

It is known in the prior art to manufacture non-corrective eyeglasses such as sunglasses or protective eyeglasses having wrap-around segments designed to shield the eye from incident light, wind, and foreign objects in the temporal vision field of the wearer.

Visible light and light in the UV region may enter the eye from angles as high as 100° from the line of sight. There has been a need to provide sunglasses or protective eyeglasses, with a significant range of refractive powers, whilst maintaining a cosmetically acceptable appearance. The high radius of curvature required for a properly aligned ophthalmic lens including a prescription surface to enclose the wearer's eyes is such that the spectacles would produce a bug-eyed appearance, which would be cosmetically unacceptable. Fashionable eyewear incorporating wide field spherical lenses of very high curvature, such as those disclosed in U.S. Pat. No. 6,142,624 to Applicants, are positioned close to the eyes to enclose the visual field of the wearer whilst maintaining alignment of the optical axes with the direct line of sight. As disclosed in this patent frames for such lenses may be designed to lie on an extension of a spherical front surface thereof.

Applicants disclose in International Patent Application PCT/AU97/00188 "Improved Single Vision Lenses" (now U.S. Pat. No. 6,361,166), an optical lens element including a front and back surface, at least one surface being continuous, and forming a prescription (Rx) zone and a peripheral temporal zone for providing a shield in the area of the temples, which zones are smoothly blended to avoid a prismatic jump from the Rx zone to the temporal zone. These lenses are designed to be located before the wearer's eyes so that the direct line of sight intersects the optical center of the lens front surface, but the optical axes are rotated temporally in order to assist achievement of the wrap-around configuration. Such lenses have surface corrections in order to reduce optical errors within the field of vision as a result of the intended horizontal tilt.

In International Patent Application PCT/AU98/00274 "Lenses and Spectacles Bearing Lenses" (now U.S. Pat. No. 6,334,681), to Applicants, the entire disclosure of which is incorporated herein by reference, Applicants disclose an ophthalmic article including an optical lens element having a front and back surface, at least one surface being continuous, and forming a prescription (Rx) zone and optionally a non-prescription peripheral temporal zone, at least one surface exhibiting a change of base curve across the field of vision of the wearer; the front and/or back surface bearing a surface correction to at least partially adjust for optical errors. The curvature changes accentuate the lens surface shape in order to fit the contour of the wearer's face and minimize the need for tilt.

Whilst such lenses provide lens design options not heretofore available, it is necessary to provide spectacle frames for such unusually shaped lenses.

OBJECTS AND ADVANTAGES OF THE INVENTION

Applicants have investigated the topological properties of surfaces with changing base curve across a desired aperture, investigating in particular the opportunity to maintain a simple geometric form for the carrier surface on which the lens aperture is formed, despite the complexity of the surface to be intersected by the frame outline.

Most eyeglass lenses and frames are formed on spherical, cylindrical or toroidal "carrier surfaces", meaning that the aperture outlines of the lens and the frame may be formed on a simply defined surface that is proximate the physical surface of the lens being glazed. For non-corrective lenses, the carrier surfaces and the lens front surface are usually coincident. Wrap around shields and unitary lenses may employ elliptic or high order polynomial surface forms. In this case, the lens outline is typically formed directly on the lens surface and the difficulties presented in creating a closed lens aperture are avoided by using temple bar or rimless forms of lens support. See for example U.S. Pat No.: 1,741,536 (Rayton); U.S. Pat. No. 4,859,048 (Jannard); U.S. Pat. No. 4,867,550 (Jannard); U.S. Pat. No. 5,604,547 (Davis); U.S. Pat. No. 5,774,201 (Tackles); U.S. Pat. No. 5,689,323 (Houston et al.) and; U.S. Pat. No. 5,825,455 (Fecteau et al.).

The design of prescription lenses is complicated by the need to eliminate optical errors in the oblique visual field. Specifically, the lens designer needs to observe a relationship between front surface curvature and lens through power specified by the so-called "Tscheming Ellipses" first described 100 years ago. These identify specific combinations of frontal base curvature and Rx power that minimize oblique astigmatic and/or power errors as shown below. See, M. Jalie, *The Principles of Ophthalmic Lenses* p. 418–422 ($4^{th}$ Ed. London, 1994).

| Rx | Zero Oblique Astigmatism | | Zero Oblique Power Error | |
|---|---|---|---|---|
| | F1 | F2 | F1 | F2 |
| +5.0 | 13.02 | −8.02 | 9.84 | −4.84 |
| +3 | 10.91 | −7.91 | 8.36 | −5.36 |
| +1 | 9.16 | −8.16 | 7.05 | −6.05 |
| 0 | 8.37 | −8.37 | 6.45 | −6.45 |
| −1 | 7.63 | −8.63 | 5.88 | −6.88 |
| −5 | 5.04 | −10.04 | 3.85 | −8.85 |

Such "best form" lenses have front surfaces that are consistently steeper as the Rx becomes more positive. When referred to a fixed aperture, the front vertex height (plate height) also increases as the Rx becomes more positive. Accordingly a range of typical prescription lenses has a range of different front surfaces. It is an objective to accommodate a full range of Rx values with a single frame to a given style. It follows that even for simply formed prescription lenses, the frame carrier surface and the lens carrier surface will be coincident in one part of the prescription range only.

It is impractical in the design of frames for conventional prescription lenses to make the frame carrier surface coincident with the front surface of the lens it retains, unless the frame is of a temple bar or rimless style. An exception to this occurs for a specific group of very highly curved lenses wherein a range of different prescriptions can be satisfied at a single base curve. See U.S. Pat. No. 6,142,624 (Morris et al.). In general, however, the carrier surface will be of a generic form that allows a range of related lens surfaces to conform to the rimmed aperture outline or eye-wire.

Eyeglass frames usually sit snugly in front of the wearer's face, being spaced sufficiently therefrom to avoid physical contact whilst being stably positioned. Prescription frames have low curvature along the brow lines, typically equaling the best form base curves required for the most negative lenses of an Rx range. High minus lenses glaze flush with the frame contour and others protrude increasingly as the power is more positive, so that in general, the lens front vertex is located forward of the frame carrier surface. The choice of aperture shapes must allow the height difference between the frame carrier surface and the lens front surface to remain within a tolerance along the lens periphery that is consistent with the typical edge thickness of a lens, e.g. to within about ±0.5 mm.

Sunglass frames of the wrap-around form typically have curvature of approximately 6 to 8 D toward the temples. When prescription lenses are fitted, the substance of the inner lens surface intrudes into the space before the wearer's face. A minus lens protrudes at the temporal limits of the frame aperture, as depicted in FIG. 1a. A plus power flattens the back surface of the lens, intruding against the eyelashes. In practice, wrap-around frames of currently popular styles are consistent with posterior horizontal curves between about 6 and 12 D. This limits the prescription range for an 8 base front surface to within about −4 to +2 D, optical design issues apart. Lenses of higher base curve, such as 10 or 12 D for example, offer the potential of a wider prescription range. As shown in FIG. 1b, however, such curves place the lens front vertex outside the design line of popular 8 base design styles and introduce a bug-eyed appearance in the nasal region.

This effect may be eliminated or reduced substantially by using lenses whose front surfaces follow a high base curve in the temporal region and are flattened across the line of sight toward the nasal region. Such lenses may be envisioned as a fusion of the styles of dress eyewear in the forward sense, and of highly wrapped non-corrective sunglasses and shields in a wide-angle sense reaching to the temples. Desirably, they may be glazed into rimmed or partly rimmed frames that are both fashionable and accommodate a range of prescriptions.

It is accordingly a broad object of the present invention to provide rimmed frames, or frames having at least one rimmed portion along the lens aperture, with carrier surfaces having simple and generic topography suited to use with lenses whose front surfaces are of compound design.

By "compound design" and "compound curve" we mean to describe lens surfaces and lenses that have changing base curve across at least one section of the frame or lens aperture, the change in base curve being at least 3 D in a horizontal section and/or 2 D in a vertical section thereof.

By "base curve" we mean the mean curvature, or numeric average of the two principal curvatures of a two dimensional surface as set forth in the *CRC Concise Encyclopedia of Mathematics*, by E. W. Weisstein, Chapman & Hall, New York 1999, p. 1152. The change in base curve may occur locally on the surface or across an extended region of the surface. Preferably there will be a smooth change in base curve across a substantial portion of the lens aperture as glazed in a spectacle frame.

Another object of the invention is to provide rimmed frames, or frames having at least one rimmed portion along the lens aperture, whose carrier surfaces are of monoformal geometry.

By "monoformal geometry", we mean standard optical surfaces of conic, cylindrical, spherical, conicoidal or toroidal topography whose cross-sectional curves are of generally quadratic standard form across the frame or lens aperture, thus simplifying manufacture of the frames and also simplifying design modifications of the lens front surface to accommodate optical requirements in a series of lenses to a particular contoured style. By "monoformal surface", we mean to describe a cap or dome having a vertex from which it curves equally to either side and symmetry around the vertex that corresponds to a non-closing surface element from an ellipsoid, toroid, cylindroid, sphere or cylinder. Preferably such monoformal surfaces encompass also oblate spheroids and ellipsoids, whose curvature changes monotonically across at least one section of the frame aperture.

In so far as we refer below to the carrier surface being toroidal, ellipsoidal or the like, we mean to specify the symmetry of the solid object from which the surface cap is taken.

By the term "quadratic standard form" as used here, we mean a curve belonging to any of the 9 general standard-form quadratic curves as set forth in the *CRC Concise Encyclopedia of Mathematics*, by E. W. Weisstein, Chapman & Hall, New York 1999, p. 1476, the real space examples of which are straight lines and conic sections.

These and other object and features of the present invention will be apparent from this written description and associated drawings.

SUMMARY OF THE INVENTION

In a first aspect of the present invention there is provided a spectacle frame shaped to receive and retain lenses of the wrap-around type having compound design and wherein the edge of the lens is physically retained by a rimmed frame aperture of generally ovaline shape and is located on a monoformal carrier surface, despite the base curvature of the lens changing across at least one section of the lens aperture.

Such frames and the lenses they retain, differ significantly in curvature relationship from frames and lenses known in the prior art.

By the term "lens of the wrap-around type", we mean that at least one surface of the optical lens falls on a topographical surface that wraps around the human visual apparatus or forms a facial shield. The topological shape of lenses used in the present invention may be characterized by sagittal depth, which is generally a measure of the three-dimensionality of the lens and lens edge. These depths typically relate to the distance between a vertical plane normal to the line of sight of the lens and the temporal-most edge point and the nasal-most edge point.

In a further aspect, the present invention provides a spectacle frame shaped to receive and retain optical lenses of the wrap-around type wherein the aperture of the lens outline or edge of at least one surface of the optical lens is of generally ovaline shape and exhibits sagittal depth at the horizontal temporal limit that is at least 10 mm greater than the sagittal depth at the horizontal nasal limit. More preferably, the sagittal depth of the lens at the horizontal temporal limit is at least 15 mm greater than the sagittal depth at the horizontal nasal limit.

Preferably, the sagittal depth of the front surface of the glazed lens at its nasal limit will be less than 5 mm, thus maximizing the conformity of the lens and frame to the wearer's face.

The frame will have sufficient curvature and length in the horizontal direction of its datum line to enclose a wide visual field and afford physical protection to the wearer's eyes. Its forward location, curvature and length from datum center to the nasal edge of the datum line and the upper and lower ends of the vertical primary meridian will avoid physical clash with the wearer's face and eye lashes. Suitable frames exhibit lens aperture shapes that are relatively broad in the field of forward vision and taper steadily towards the temples, conforming to the human facial structure.

By the terms "lens" as used herein we mean a cut or shaped-edge optical or ophthalmic lens.

The optical lens may be removably or permanently attached to the frame. It may provide a corrective prescription in a range of minus or plus powers or may be plano, and, in some embodiments, is suitable for industrial safety or contact sport applications.

The spectacle frame according to aspects of the present invention may be rimmed, or partially rimmed, allowing the lens elements to be retained securely in front of the wearer so that the optical design axes of the lens elements may be held closely parallel with the wearer's direct line of sight in distance vision and aligned according to the interpupillary distance of the wearer.

By "optical design axis" as used here, we mean the axis intended by the lens designer to be aligned with the wearer's direct line of sight. This may not coincide with the optical axis of the optical lens element if, for example, the lens is designed specifically to be tilted or decentered as a means to enhance wrap toward the temples. Such lenses typically bear surface corrections to compensate for their intended orientation.

The aperture outline of a spectacle frame is usually represented by its projection on the vertical frontal plane of the lens. Its definition requires four datum points spaced on the front surface of the lens periphery and one additional condition specifying the frame carrier surface. Convenient datum points are the four points of intersection of the lens periphery with the horizontal "equator" and vertical "prime meridian" lines through the lens front vertex. We represent these in coordinates originating at the lens front vertex. The lens front and the frame carrier surface must conform closely at the four datum points, and these surfaces should be confluent within allowed tolerances (say ±0.5 mm) along the aperture outline, although they may be quite separate elsewhere across the aperture. The final condition locates the lens front vertex relative to the frame carrier surface.

In order to facilitate discussion of the geometrical relationships involved, we now define a series of simple surfaces that specify particular aspects of the compound lens surface, specifically one that has increasing curvature from a nasal region to a temporal region:

The "steepest internal bounding surface" or "internal boundary" is the specific toroidal, spherical or cylindrical surface that intersects the four datum points at the lens front periphery and is co-tangential with the lens front surface at the nasal limit;

The "mean slope surface" is the specific toroidal, spherical or cylindrical surface that intersects the four datum points at the lens front periphery and has equal differences in slope relative to the lens surface at both the nasal and temporal limits;

The "mean height surface" is the specific toroidal, spherical or cylindrical surface that intersects the four datum points at the lens front periphery and also the lens front vertex; and The "shallowest external bounding surface" or "external boundary" is the specific toroidal, spherical or cylindrical surface that intersects the four datum points at the lens front periphery and is co-tangential with the lens front surface at the temporal limit.

For spherical, cylindrical and toroidal lenses, all of the above surfaces are coincident and are exactly the lens front surface. Prior art prescription spectacle frames and dual lens sunglass frames position the optical lenses in the frame so that each lens front vertex is located on its respective frame carrier surface, or is located forward away from the wearer. The analogous principle for compound design lens surfaces would be to locate the frame carrier surfaces at the mean height surface or rearward thereof. However, there is a continuous perimeter of intersection between the frame carrier surface and the lens front surface only when the two are spaced apart, for example when the frame carrier surface is near to or behind the inner boundary surface. This configuration places the lens front vertex forward of the frame carrier surface analogously to the prior art. But, we have found that the aperture shapes allowed by the confluence of the surfaces along their perimeter of intersection do not enclose the wearer's visual apparatus as required. The corresponding aperture shapes taper nasally and do not surround the field of forward vision.

The geometry of compound design surfaces is distinguished by the presence of separated inner bound and external bound surfaces. These are depicted in FIG. 3a, where: Curve 1 is a horizontal section of a compound design surface; Curve 2 is the external bound surface merging tangentially at the temporal limit T; and, Curve 3 is the internal bound surface merging tangentially at the nasal limit N. Frames that utilize the face conforming geometry of compound designs and also allow desirably shaped apertures, surrounding the field of forward vision and tapering toward the temples, place the frame carrier surface near to the external boundary surface or forward thereof. Such frames locate the lens front vertex rearward of the frame carrier surface. The arrangement is depicted schematically in FIG. 3b.

In another aspect, the present invention provides a rimmed spectacle frame shaped to receive and retain lenses of the wrap-around type wherein each aperture of each lens' outline or the edge of at least one surface of each lens is of generally ovaline shape enclosing the forward field of vision and conforming with facial form toward the temples, and wherein the frame apertures are designed to generally spherical, cylindrical or toroidal carrier surfaces (monoformal surfaces) that are always more highly curved than the lens mean height surface, so positioning the lens front vertex rearward of its respective frame carrier surface.

In a preferred form, the lenses are retained securely by one or more rimmed sections of arcuate frame apertures each following the frame carrier surfaces. These sections may be interrupted by unconstrained segments of the lens periphery edged so as to improve conformity of the glazed spectacles to the nose and/or brows, or to accentuate the outline of the lens in the vicinity of the temples or cheek line.

Greatest freedom in the selection of aperture outline shapes occurs when the frame carrier surface and the lens front surface merge intimately in the vicinity of their true intersection path. In this case, the frame carrier surface must be close to the shallowest surface that bounds the lens front surface externally while intersecting the established datum points, the "external boundary".

In a still further aspect, the present invention provides a rimmed spectacle frame, shaped to receive and retain lenses of the wrap-around type, wherein the apertures of the lenses outline or edge of at least one surface of each lens is of generally ovaline shape enclosing the forward field of vision and conforming with facial form toward the temples, wherein the frame apertures are each designed to a generally spherical, cylindrical or toroidal carrier surface that is closely proximate the shallowest surface that bounds the lens front surface externally while intersecting the frame datum points.

The foregoing is intended only as a summary of this disclosure, the scope of the invention being determined by the literal language of the claims and equivalent thereof.

TABLE I

SYMBOLS USED IN WRITTEN DESCRIPTION AND DRAWINGS

| Symbol | Meaning |
| --- | --- |
| (Ox, Oy) | Vertical frontal plane of lens |
| $A_0$ | Lens front surface base curve nasally or at the lens apex |
| $A_1$ | Lens front surface base curve temporally |
| $A_2$ | Lens front surface base curve vertically |
| $A_3$ & $A_4$ | Frame carrier surface base curve horizontally and vertically |
| $B_n$ | Lens surface height polynomial coefficient |
| F(x) | Frame carrier surface height function horizontally |
| F(x, y) | Frame carrier surface height referred to lens frontal plane |
| $F_1$ & $F_2$ | Spherical lens front and back surface curvature |
| Ox | Horizontal (Equatorial) axis of right lens (directed temporally) |
| Oy | Vertical (Prime Meridional) axis of right lens (directed upward) |
| Oz | Normal line of sight or Optical Axis (directed toward wearer) |
| r | Radial distance in lens frontal plane |
| Z(x) | Lens front surface height function horizontally |
| Z(x, y) | Lens front surface height referred to lens frontal plane |
| $\alpha, \beta, \gamma$ | Decentration of frame carrier surface vertex along Ox, Oy, Oz |
| $\rho_0$ | Lens front radius nasally or at the lens apex |
| $\rho_1$ | Lens front radius temporally |
| $\rho_2$ | Lens front radius vertically |
| $\rho_3$ & $\rho_4$ | Toroidal frame carrier surface radii horizontally and vertically |
| $\rho_X, \rho_Y, \rho_Z$ | Ellipsoidal frame carrier surface semi-major axes along Ox, Oy, Oz |

DETAILED DESCRIPTION OF DRAWINGS AND EXAMPLES

Outline

Basic Geometry of Compound Lenses

Blending of Compound Lens Surfaces

Effect of the Frame Carrier Surface on Aperture Shapes

Basic Geometry of Compound Lenses

The basic geometry of wrap-around lenses with change of base curve across the field of view of the wearer will be described so as to provide context for the discussion of frames according to the current invention.

Lenses that may be included in frames giving various degrees of wrap, the front surface perimeters preferably being independent of the Rx, and the surfaces having a change in base curve across the field of vision of the wearer, are disclosed for example in U.S. Pat. No. 6,334,681 (Perrott et al.). A suitable mathematical form through which to describe these surfaces when defined by circular sections is;

$$Z(x, y) = \rho_2 - \sqrt{(\rho_{2-Z(x)})^2 - y^2}$$

where $$Z(x) = \rho_0 - \sqrt{\rho_0^2 - x^2} \, ; \quad x \leq 0$$

$$= \rho_1 - \sqrt{\rho_1^2 - x^2} \, ; \quad x > 0$$

The nasal, temporal and vertical radii, represented by $\rho_0$, $\rho_1$ and $\rho_2$ respectively, are defined by the choices of base curve $A_0=530/\rho_0$, $A_1=530/\rho_1$ and $A_2=530/\rho_2$. These lens surface forms are relatively complex in terms of the established art of lens design. They may be glazed to rimless or temple bar frame styles whereupon the edge forms will be generated as outline curves on the topographically complex lens surface.

Figure 1A:
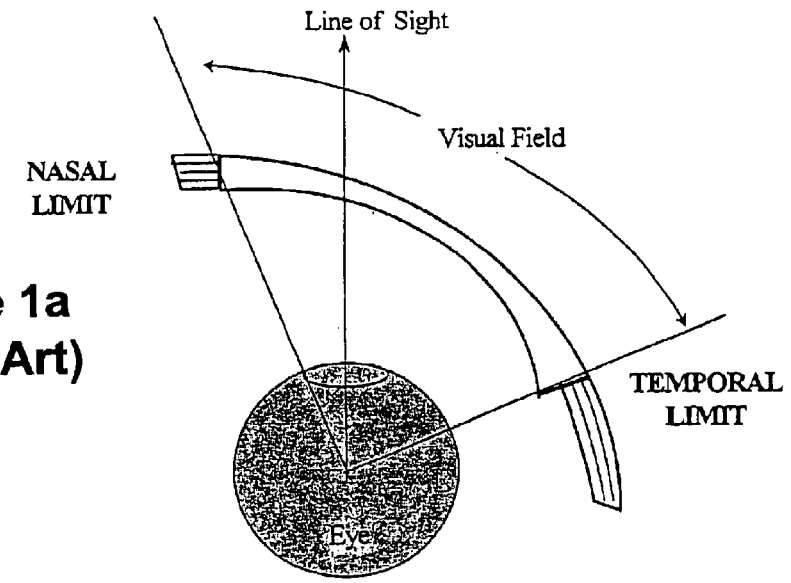
FIG. 1 depicts prior art wrap around sunglasses fitted with prescription lenses.
Figure 1B:
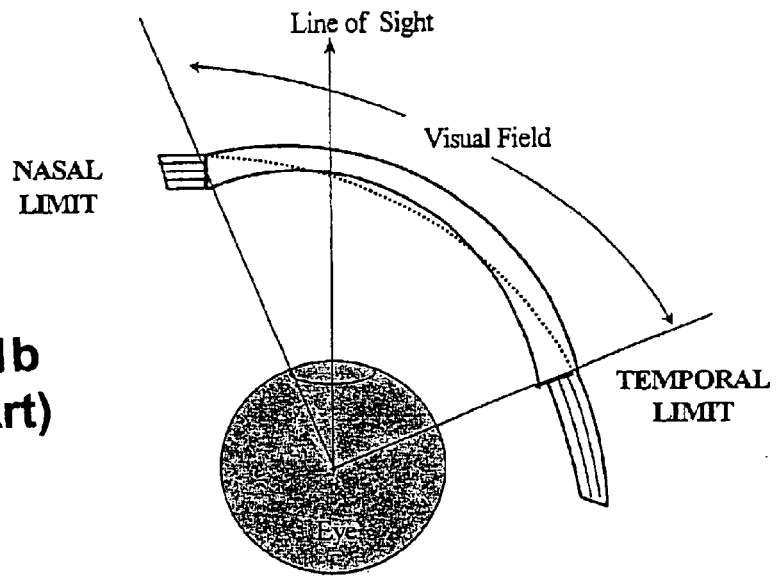
Figure 2:
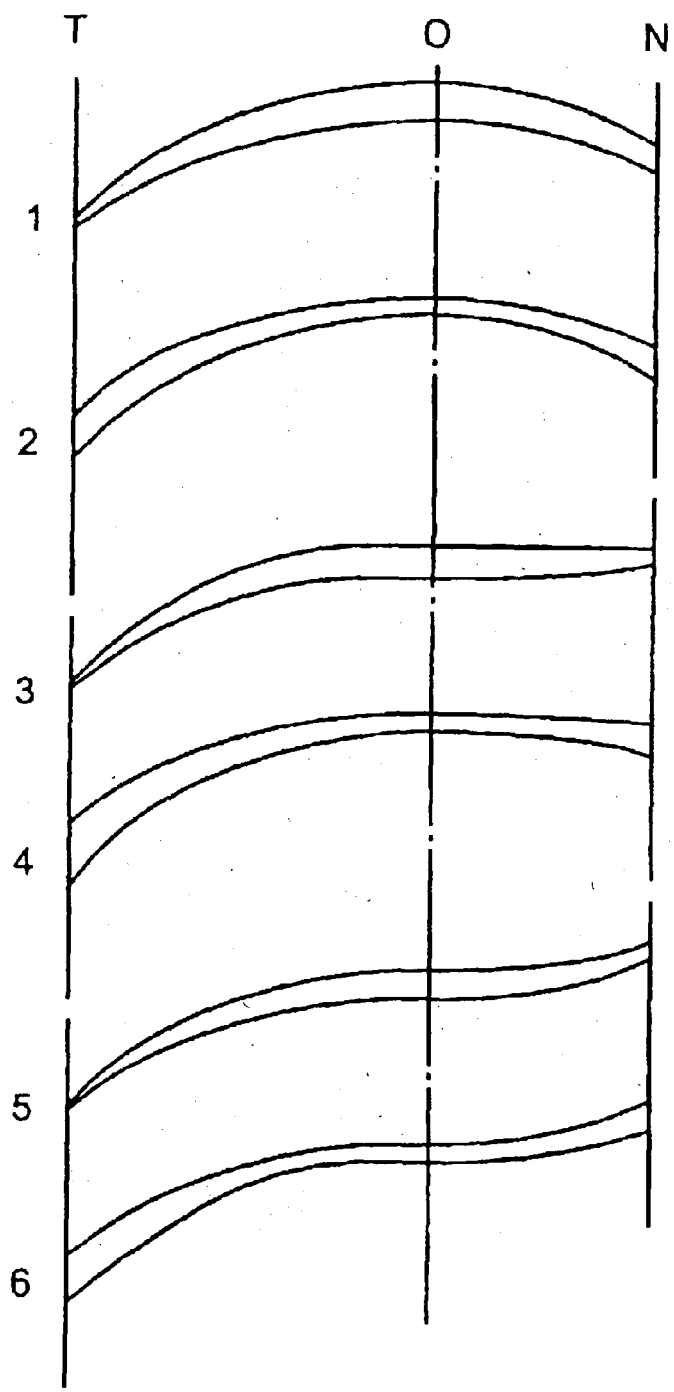
FIG. 2 depicts the equatorial section of prior art sunlenses that accentuate facial form at the wearer's temples and in the nasal region. Such lenses are to be positioned before a wearer so that the optical axis coincides with the direct line of sight.
Figure 3A:
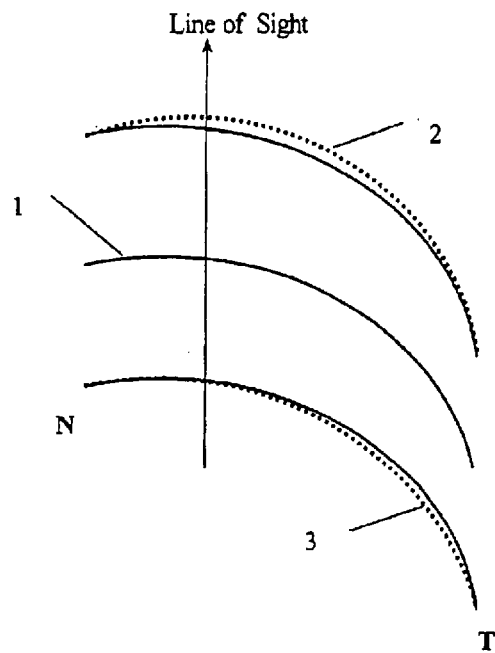
FIG. 3 shows the distinguishing features of a compound curve lens surface and the arrangement of corresponding wrap around frames according to the current invention.
Figure 3B:
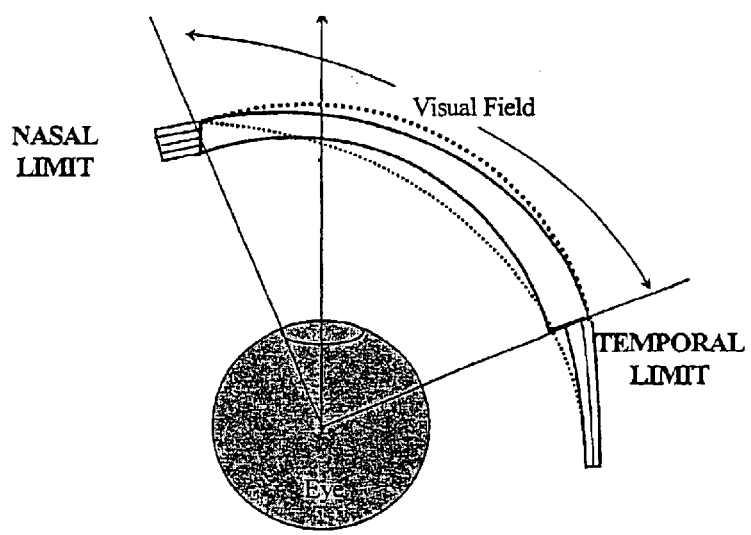

The designs depicted as lenses 3 and 4 in FIG. 2, as disclosed in U.S. Pat. No. 6,334,681, provide positive or negative vision correction as required. They also represent a series of corrective and non-corrective lenses with geometrically similar front surfaces independent of the Rx. The current invention is concerned with these and related lens forms, an objective being to fit them to geometrically simple ranges of frames.

In a preferred embodiment of the present invention, there is provided a rimmed spectacle frame shaped to receive and retain lenses of the wrap-around type wherein the frame apertures are of generally ovaline shape and retain the outline or edge of at least one surface of the lens which surface has a radius of curvature that varies across the vertical or horizontal sections of the aperture of the lens outline, or both the vertical and horizontal sections thereof.

The change may for example correspond to 3 D or more horizontally and 2 D or more vertically.

In another preferred aspect of the present invention, there is provided a rimmed spectacle frame shaped to receive and retain lenses of the wrap-around type wherein the aperture of each lens outline or edge of at least one surface of each lens is of generally ovaline shape and remains substantially constant irrespective of lens power.

The optical lenses according to this aspect of the present invention may provide prescription (Rx) correction generally in the range of −6.0 D to +6.0 D, and be used to provide a family of spectacles with a common frame design but with different optical correction depending on the prescription of the wearer. The back surface of the lenses may be configured to provide appropriate power and astigmatism correction.

In a still further aspect of the current invention, the frame aperture is designed to a carrier surface that intersects four datum points on the lens periphery and a point on the lens design axis that is located forward of the lens front vertex, the carrier surface having substantially constant radii of curvature along the primary meridians.

The apertures of the spectacle frames may be shaped in such manner as to facilitate correct location and alignment of the lens design axes relative to the wearer's direct line of sight, and/or to achieve face conforming features in the nasal regions.

FIG. 2 depicts other lenses (5 and 6) that may be included in products accentuating facial form at the nose as well as temples, such as glazed lenses or complementary lens elements for shields. Shields may be clear sports shields designed solely to protect the face in ball sports such as basketball, where the activity precludes heavy helmets and the like used for example for American football. Alternatively they may provide UV protection, guarding against skin cancer as is experienced commonly on individual's noses.

In FIG. 2 there is depicted the horizontal section of Rx lenses whose optical axis 0 is located closer to the nasal limit N than the temporal limit T. Lenses 1 and 2 are conventional spheres with front and back base curves of 6 D and 8 D to produce Rx lenses of plus and minus 2 D.

Lenses 3 and 4 have the same 6 and 8 D spherical base curves from temple T to optical axis 0. Toward the nasal limit, both lenses have flat front curves approaching ~0 D. The plus Rx lens 3 is biconvex with a negative back surface curve to provide the required refractive power. These lenses give maximum temporal reach for lenses of conventional cosmetic appearance whilst also having least curvature of the nasal design. A full Rx range is preferably designed with a constant overall front surface form, with aspheric or atoric correction as necessary to satisfy optical design requirements. However physical requirements for lens clearance at temporal and nasal limits may dictate that lower design curve power be used for higher minus Rx lens categories.

Lenses 5 and 6 have the same spherical design toward the temples as other lenses in this figure. However, the curves from optical axis 0 to nasal limit N are negative in each instance.

These last lenses have a distinctive shape and reach forward toward the nasal bridge as well as back to the temples. They may be manufactured with general conic orthogonal curves approximately 6 to 9 D or so and are most obviously useful for creating eyewear that accentuates the contours of the face including the nasal region. This could be for sunwear but also applies to sports visors such as basketball visors where a safety shield fits closely around the face to protect temples, cheeks and the nose. The lenses designed on the principle of 5 and 6 in FIG. 2 satisfy such purpose.

Blending of Compound Lens Surfaces

The lenses 3 to 6 depicted in FIG. 2 exhibit an abrupt change of base curve in the equatorial direction at the prime meridian. This feature may introduce unwanted optical aberrations due to lens manufacturing errors and deficiencies. Accordingly a preferred lens front surface design exhibits a more gradual change of base curve across the field of vision of the wearer, the base curves being smoothly blended to avoid a prismatic jump in the Rx zone. The changes in curvature may be distributed smoothly across the aperture of the lens outline.

The changes in curvature for example, may occur across the field of direct (forward) vision of a wearer, that is within 55° of the line of sight for distance vision. Alternatively, the change in curvature may occur across the line of sight and within the cone of foveal vision; that is, approximately 25° either side of the line of sight. In a further alternative, the change of curvature may occur in the off-axis field of binocular vision that is approximately 25° to 55° either side of the line of sight of the wearer. Still further the change in curvature may occur in the off-axis peripheral field, that is more than 55° away from the line of sight of the wearer.

The changes in curvature may be viewed as asymmetric with respect to the line of sight. For example the curvature may increase in the temporal direction horizontally from nasal limit toward the peripheral viewing field or increase in down gaze vertically from the eyebrows to the limits set by nose and cheek intrusion into the visual field. Alternatively the vertical and/or horizontal curvatures remain constant from the line of sight to the visual limits corresponding to brow or nasal intrusion on the visual field. The vertical and/or horizontal curvatures may remain constant from the nasal or brow limits to approximately 25° temporal or down-gaze from the line of sight. For example the temporal curvature is constant to approximately 55° from the line of sight.

In a further aspect of the current invention, the change in curvature across the aperture of the lens must be sufficient to achieve sagittal depth at the temporal limit of the lens aperture exceeding that at the nasal limit by 10 mm or more. The required magnitude of the change in base curve depends on the nasal curvature, the lengths of the nasal and temporal segments of the frame datum line and on the location of the region where the changes of curvature occur. They will commonly be 6 D or more, preferably 9 D or more.

U.S. Pat. No. 6,334,681, to Applicants, includes examples of lenses where two surface sections of different curvature are blended smoothly in the horizontal direction to make the first and second derivatives of each lens surface smooth and continuous in themselves. A suitable mathematical form given therein for blending the base curves describes the surface height Z(x) as polynomials in terms of the horizontal coordinate x and suitably chosen coefficients $B_n$;

$$Z(x) = \sum_{n=0}^{4} B'_{2n} x^{2n}; x \leq x_0$$

$$= \sum_{n} B_n x^n; x_0 < x \leq x'_0$$

-continued $$= \sum_{n=0}^{4} B''_{2n} x^{2n}; x > x'_0$$

wherein $x_0$ and $x'_0$ are located within or near the edges of the prescription zone. The coefficients $B_{2n}$ and $B'_{2n}$ define the height and curvature of the two zones being blended together.

The variable x in the above expressions may be replaced with the radial distance $$r = \sqrt{(x^2+y^2)},$$

whence the blend zone becomes a circular annulus and the lens front surface assumes rotational symmetry with respect to the lens front vertex, such as for the lenses described in U.S. Pat. No. 6,361,166, to Applicants. The lens surfaces can then be discussed in terms of vertex and temporal base curves rather than nasal, temporal and vertical curves.

In a still further aspect of the present invention there is provided a spectacle frame of the wrap-around type, the spectacle frame having at least one rimmed portion shaped to receive and retain a lens, each lens including a front and back surface, at least one such surface of each lens being rotationally symmetric with respect its vertex and exhibiting a change of base curve across the field of vision of the wearer.

In a further preferred embodiment where the lens front surface is a surface of revolution and the radius of curvature changes across the lens aperture, the change in curvature is 3 D or more.

The optical lenses used in the present invention may provide prescription (Rx) correction generally in the range of −4.0D to +4.0D and more preferably of −6.0 D to +6.0 D.

Effect of the Frame Carrier Surface on Aperture Shapes

It will be understood that the rearward temporal reach for lenses of the wrap-around type, glazed in frames according to the present invention, may, for example, extend for approximately 10 to 25 mm further than that at the nasal side.

According to the present invention, the lenses may provide prescription (Rx) correction generally in the range −6.0 D to +6.0 D, wherein the front surface is capable of being mounted in a frame of constant and geometrically simple carrier surface design irrespective of the Rx, wherein:

The back surface provides good clearance from temples or eyelashes;

At least one surface of the lens exhibits a change of base curve across the field of vision of the wearer;

The frame aperture encloses the region of the wearer's eyes, and;

The frame aperture outline tapers from the region of forward vision toward the temples, so conforming to human facial features.

Preferably the front surface of the lens has a compound curve extending from a low curvature at the nasal limits to a high curvature at the temporal limits, but the vertical curve is 6 D or below. Alternatively the lens is rotationally symmetric and has compound radial curve with high curvature in the temporal region and low curvature around the front vertex.

Preferably, the horizontal curvature of the lens mean height surface is at least 7 D and that of the frame carrier surface is at least 8 D. More preferably, the lens mean height curvature is 10 D or greater in the horizontal direction, most preferably 12 D or more.

It will be understood that the interrelation of frame carrier surface geometry and that of the lens front surface is critical in adapting the frame and glazed prescription lenses to the shape of the wearer's face and so achieving an article of eyewear that has functional wrap-around style and a pleasing appearance. The available outline shapes change somewhat as a toroidal carrier surface is located at different distances forward of the lens front vertex. However, the use of ellipsoidal carrier surfaces adds one extra degree of freedom and opens out the area in which a lens outline curve may be placed.

In another aspect, the present invention provides a rimmed spectacle frame shaped to receive and retain lenses of the wrap-around type wherein the apertures of the lenses' outline or edge of at least one surface of each lens is of generally ovaline shape enclosing the forward field of vision and conforming with the facial form toward the temples, and wherein the frame apertures are each designed to a generally spheroidal or ellipsoidal carrier surface that is always positioned forward of the lens mean height surface between the lens front vertex and the temporal limit, so ensuring that the lens front vertex is not forward of its respective frame carrier surface.

Preferably, the choice of ellipsoidal, toroidal, spherical or cylindrical geometry for the frame carrier surface will permit lenses of a range of Rx values to be mounted satisfactorily in a frame of specific design notwithstanding changes of mean front surface curvature of the lens front surface necessitated by optical design requirements for the lenses of different Rx.

Preferably, the mean front surface curvature changes within the field of forward vision may amount to 2 D or more between plus and minus lenses, more preferably 4 D or more, and desirably 6 D.

Unless the changes of mean front surface curvature across a range of prescription lenses are controlled systematically, there will be an increasing range in surface height differences around the aperture perimeter curve as the curvatures are changed from those of the surface for which the frame design was optimized. Because the edges of plus lenses are thin and those of minus lenses relatively thicker, the frame design should be optimized for those surfaces intended to provide lenses of the highest plus powers.

In a further aspect, the present invention provides a rimmed or partially rimmed spectacle frame shaped to receive and retain compound design lenses of the wrap-around type in a range of prescriptions wherein the difference in height of the frame rim or its center line and a lens outline or edge of at least one surface of the lens remains constant within a tolerance that is generally tighter for plus powered lenses than for minus powered lenses.

The present invention will now be described more fully with reference to the accompanying figures and examples. It should be understood, however, that the description following is illustrative only and should not be taken in anyway as a restriction on the generality of the invention claimed.

EXAMPLES

Example 1 (Comparative Example of FIG. 4)

In order to investigate the possibility of employing frames of simple geometrical form to support lenses 3 and 4 of FIG. 2 and the like, we represent the frame carrier surface as a circular toric surface of similar mathematical form to the sectors of lens surface, $$F(x,y) - \gamma = \rho_4 - \sqrt{(\rho_{4-F(x)})^2 - (y-\beta)^2}$$

where $$F(x) = \rho_3 - \sqrt{\rho_3^2 - (x-a)^2}$$

The solid object defined by this surface may be termed a "cylindroid". See *CRC Concise Encyclopedia of*

*Mathematics*, Weisstein, Chapman & Hall (New York 1999) at p. 352. The frame curvatures horizontally and vertically are represented by radii $\rho_3$ and $\rho_4$ respectively, corresponding to base curves $A_3=530/\rho_3$ and $A_4=530/\rho_4$. The vertex of the cylindroid is located at $(\alpha, \beta, \gamma)$. The cylindroid becomes a sphere when $A_3=A_4$ and it becomes a cylinder when $A_4=0$.

Figure 4A:
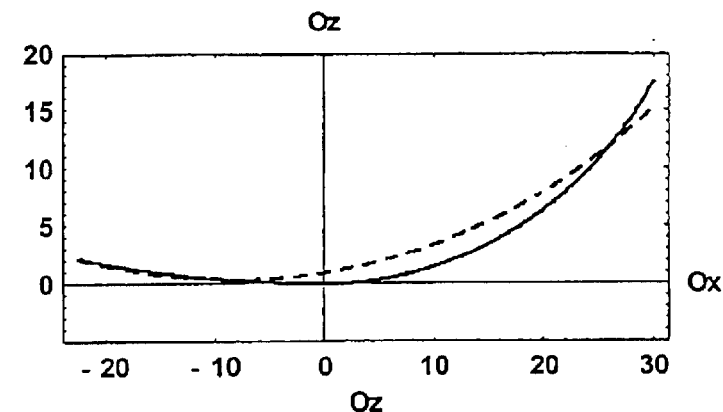
FIG. 4 depicts the intersection of a lens whose front surface has curvatures 15.4 D temporally, 4.53 D nasally and 7.25 D vertically with a frame whose carrier surface is placed rearward of the lens front vertex. The contours depicting the available area in which lens outlines may fall are projected on the vertical frontal plane (Ox, Oy) of the lens.
Figure 4B:
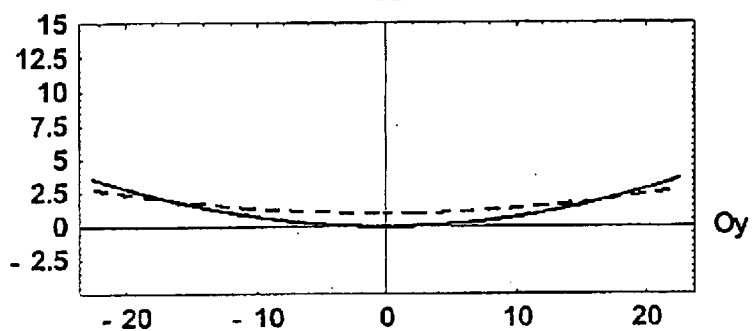
Figure 4C:
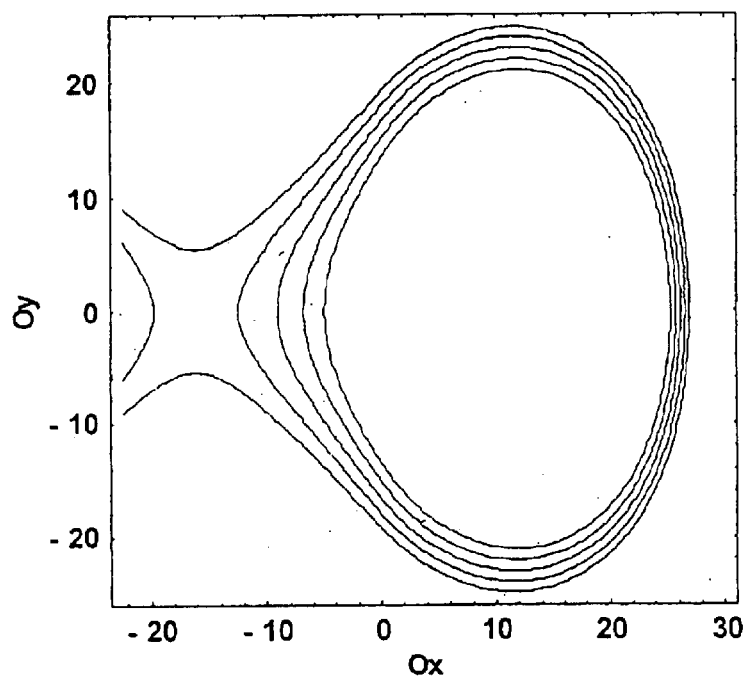

The solid line curves of FIGS. 4a and 4b depict the equatorial and prime meridional sections of the front surface of lenses with a change of base curve equatorially at the direct line of sight of the wearer. The base curves of the example are 4.55 D nasally, 15.4 D temporally and 7.25 D vertically of the lens front vertex. A lens made in polycarbonate would have surface powers 5 D, 17 D and 8 D respectively.

Frame aperture datum points for this example are (−21.5, 0, 2.0), (28.4, 0, 15.0) and (0, ±17.0, 2.0) with respect to the lens front vertex (0, 0, 0). Note that the temporal sagittal reach of the lens front periphery horizontally is therefore 13.0 mm greater than that on the nasal side. A mean height frame carrier surface intersecting the datum points and the lens front vertex would have horizontal curvature of 11.24 D and vertical curvature 7.24 D. On analysis, it is found that such a surface does not make continuous intersection with the compound curve lens surface. If, on the other hand, the carrier surface is selected to intersect the lens optical design axis at (0, 0, Z) where Z=1.0, for example, there is a continuous intersection outline formed between the lens front and the selected frame carrier surface.

Horizontal and vertical sections of the corresponding frame carrier surface are shown as the dashed lines in FIGS. 4a and 4b. It intersects the lens optical design axis rearward of the lens front vertex, according to convention in the art.

The aperture outline is restricted to fall within the region of acceptable proximity between the lens surface and frame carrier surfaces, that being within ±0.5 mm of the true intersection curve. It is thus restricted to be within the area of the corresponding contours of surface height difference contours shown in FIG. 4c. Clearly, the possible aperture shapes are undesirable for both cosmetic and functional reasons.

Alteration of the intercept height Z, while maintaining a rearward disposition of the frame carrier surface, alters the location and spacing of the height difference contours but does not alter the primary feature of the outline curves available. Namely, the aperture outline does not surround the field of forward vision. Further, the tapering region of available outline shapes is disposed nasally, rather than temporally as required for the eyeglasses to have practical utility.

Example 2 (Comparative Example of FIG. 5)

Figure 5A:
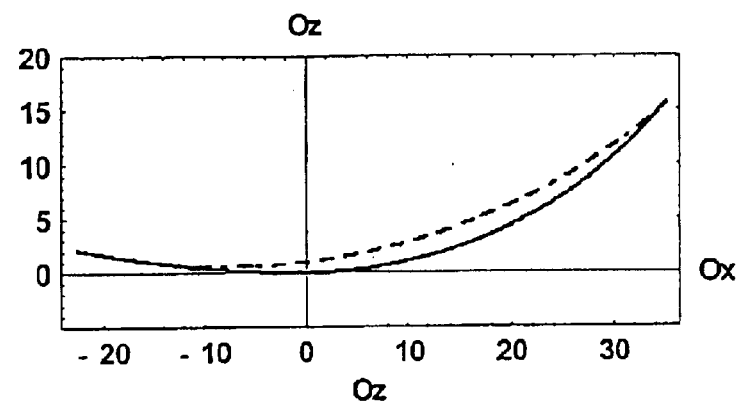
FIG. 5 depicts the intersection of a lens whose front surface has curvatures 11.3 D temporally, 4.53 D nasally and 7.25 D vertically with a frame whose carrier surface is placed rearward of the lens front vertex. The contours depicting the available area in which lens outlines may fall are projected on the vertical frontal plane (Ox, Oy) of the lens.
Figure 5B:
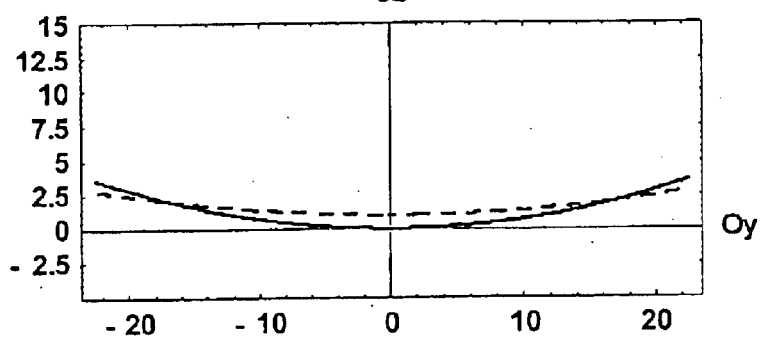
Figure 5C:
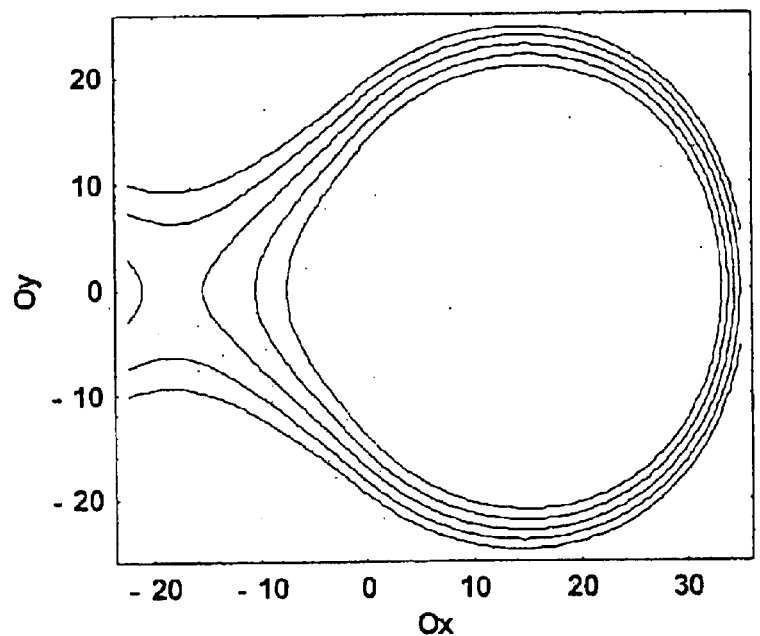
Figure 6C:
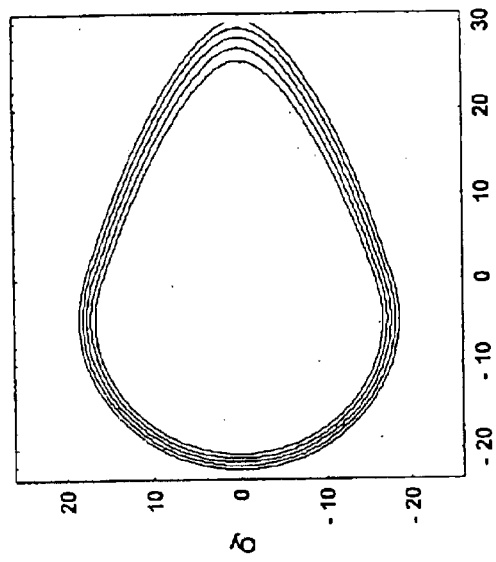
FIG. 6 depicts the intersection between the lens surface of FIG. 4 and a frame carrier surface having the same datum points but curved more highly so as to intersect the lens design axis forward of the lens front vertex.
Figure 6D:
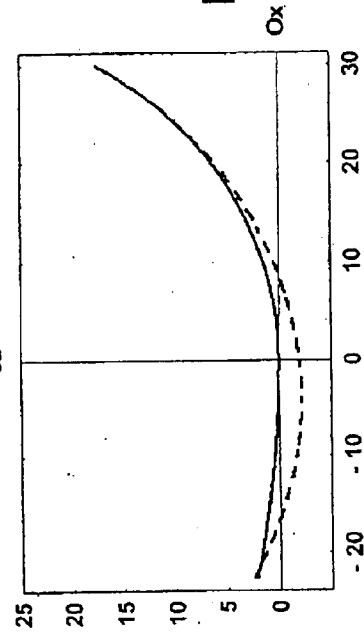
Figure 6A:
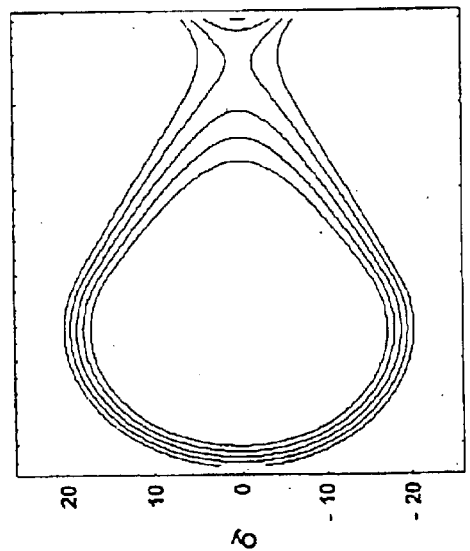
Figure 6B:
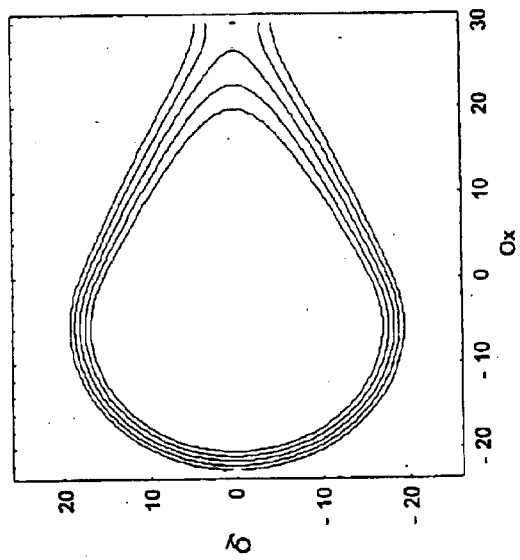

The solid line curves of FIGS. 5a and 5b depict the equatorial and prime meridional sections of the front surface of lenses with a change of base curve equatorially at the direct line of sight of the wearer. The base curves of the example are 4.55 D nasally, 11.3 D temporally and 7.25 D vertically of the lens front vertex. A lens made in polycarbonate would have surface powers 5 D, 12.5 D and 8 D respectively.

Frame aperture datum points for this example are (−21.5, 0, 2.0), (34.4, 0, 15.0) and (0, ±17.0, 2.0) with respect to the lens front vertex (0, 0, 0). Note that the temporal sagittal reach of the lens front periphery horizontally is therefore 13.0 mm greater than that on the nasal side. A mean height frame carrier surface intersecting the datum points and the lens front vertex would have horizontal curvature of 8.92 D and vertical curvature 7.24 D. On analysis, it is found that such a surface does not make continuous intersection with the compound lens front surface. If, on the other hand, the carrier surface is selected to intersect the lens optical design axis at (0, 0, Z) where Z=1.0 mm, for example, there is a continuous intersection outline formed between the lens front and the selected frame carrier surface.

Horizontal and vertical sections of the corresponding frame carrier surface are shown as the dashed lines in FIGS. 5a and 5b. It intersects the lens optical design axis rearward of the lens front vertex, according to convention in the art. The possible outline shapes are depicted by the corresponding contours of surface height difference contours shown in FIG. 5c. As for Example 1 above, the possible aperture shapes are undesirable for both cosmetic and functional reasons.

Example 3

FIG. 6

The characteristic lens aperture shapes described in Examples 1 and 2 occur because the horizontal curvature of the selected frame carrier surfaces are close to that of the steepest internal bounding surface at the compound lens surface. If the lens surface and frame carrier surface were coincident, as for many designs of wrap around eyewear, there would be total freedom in defining the lens aperture shape. Such frames for lenses with accentuating change in base curve across the field of vision of the wearer toward the temples would have complex carrier surfaces and would suit only one specific lens surface design, neither aspect being practically desirable.

Dress eyewear employs simple frame carrier surfaces of low curvature and places those surfaces between the lens front surface in the frame aperture and the wearer, as was done for Examples 1 and 2 above. If, to the contrary, we use simple but highly curved frame carrier surfaces that instead sit forward of the lens surface across most of the frame aperture (Z<0), we achieve highly desirable results.

The parameters describing the frame carrier surface for a given set of four datum points and a chosen intersection point at the optical design axis are derived by solving the five simultaneous equations for surface height, according to Example 1, using selected central intercept values Z. The results are given in Table 2.

The frame carrier surfaces change in a consistent manner as the values chosen for Z pass from a positive range to a negative range. Consider the data of Table 2, which corresponds to the lens surface and frame datum points of Example 1. For Z>0, the frame carrier surface is far more strongly curved in the horizontal direction than it is vertically ($A_3 >> A_4$). As Z becomes increasingly negative, the frame carrier surface tends toward a sphere and then subsequently assumes higher curvature vertically than horizontally.

TABLE 2

Variation in frame carrier surface with changing intersection height Z for the lens of Example 1, having curvatures $A_0 = 4.55$ D, $A_1 = 15.40$ D and $A_3 = 7.25$ D.

| Surface Type | Z | α | β | γ | $\rho_1$ | $A_1$ | $\rho_4$ | $A_4$ |
|---|---|---|---|---|---|---|---|---|
| Set Point | 1.50 | −9.442 | 0 | 0.716 | 57.27 | .25 | 289.25 | 1.83 |
|  | 1.00 | −8.323 | 0 | 0.347 | 53.34 | 9.94 | 145.00 | 3.66 |
|  | 0.00 | −6.500 | 0 | −0.450 | 47.14 | 11.24 | 73.25 | 7.24 |
|  | −1.00 | −5.070 | 0 | −1.303 | 42.51 | 12.47 | 49.67 | 10.67 |
|  | −1.25 | −4.759 | 0 | −1.524 | 41.53 | 12.76 | 46.09 | 11.50 |
|  | −1.50 | −4.463 | 0 | −1.746 | 40.62 | 13.05 | 43.04 | 12.32 |
|  | −2.50 | −3.409 | 0 | −2.655 | 37.48 | 14.14 | 34.36 | 15.42 |
| Lens Properties: |  |  |  |  |  |  |  |  |
| Internal Bound. | 1.835 | −10.344 | 0 | 0.962 | 60.48 | 8.76 | 984.54 | 0.54 |
| Mean Slope | 1.019 | −8.363 | 0 | 0.361 | 53.48 | 9.91 | 147.81 | 3.58 |
| Mean Height | 0.000 | −6.500 | 0 | −0.450 | 47.14 | 11.24 | 73.25 | 7.24 |
| External Bound. | −1.911 | −4.006 | 0 | −2.116 | 39.24 | 13.51 | 38.90 | 13.62 |
| Sphere | −1.853 | −4.070 | 0 | −2.065 | 39.42 | 13.45 | 39.42 | 13.45 |

This trend causes a consistent alteration in the shape of the intersection zone in which a frame aperture outline may be placed, as depicted in FIG. 6. A complete intersection curve occurs for $Z \leq -1.25$ mm. The contours of FIGS. 6a, 6b and 6c correspond to Z values of −1.5, −1.91 and −2.5 mm respectively, while the curves of FIG. 6d show the relationship between the lens front surface and its shallowest external bounding surface, which corresponds to FIG. 6b.

If we consider the section $y=\beta$ of the frame carrier surface, we find its surface height to vary simply as $F(x)$. Its slope at any point is this section is then given by;

$$\frac{\partial F}{\partial x} = (x-\alpha) \Big/ \sqrt{\rho_3^2 - (x-\alpha)^2} = \frac{(x-\alpha)}{\rho_3 + \gamma - F}$$

The corresponding expression for the slope of a section of lens surface is;

$$\frac{\partial Z}{\partial x} = \frac{x \cdot [\rho_2 - z(x)]}{[\rho_1 - z(x)] \cdot [\rho_2 - Z]}$$

In order to specify the shallowest external bounding surface of the lens, we equate these two slopes at the temporal limit of the lens surface, which gives a further equation to be solved simultaneously with the previous five, $$\frac{(x-\alpha)}{\rho_3 + \gamma - F} = \frac{x \cdot [\rho_2 - z(x)]}{[\rho_1 - z(x)] \cdot [\rho_2 - Z]}$$

$$\Rightarrow \frac{x}{[\rho_1 - Z]} \text{when } \beta = 0.$$

For the current example, we find that the shallowest external bounding surface corresponds to $Z=-1.91$ mm. This surface is almost spherical.

Similarly, we may determine the steepest internal bounding surface by matching the frame carrier surface slope with the lens surface slope nasally. We may also determine a "mean slope" surface by setting the slope differences between the frame carrier surface and the lens surface equal at the nasal and temporal limits horizontally. The parameters corresponding to these surfaces are given also in Table 2.

It is seen that suitable outline shapes are available when the frame carrier surface locates forward of the lens front vertex. For the lens of this example, the shallowest external bounding surface has horizontal base curve equal to 13.5 D, compared to the 15.4 D temporal curve of the lens surface.

Example 4

FIG. 7

Figure 7C:
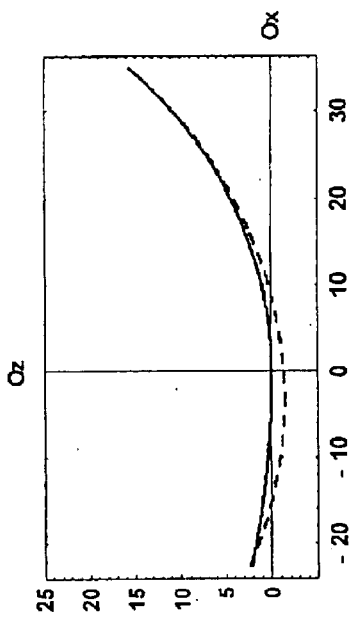
FIG. 7 depicts the intersection between the lens surface of FIG. 5 and a frame carrier surface having the same datum points but curved more highly so as to intersect the lens design axis forward of the lens front vertex.
Figure 7D:
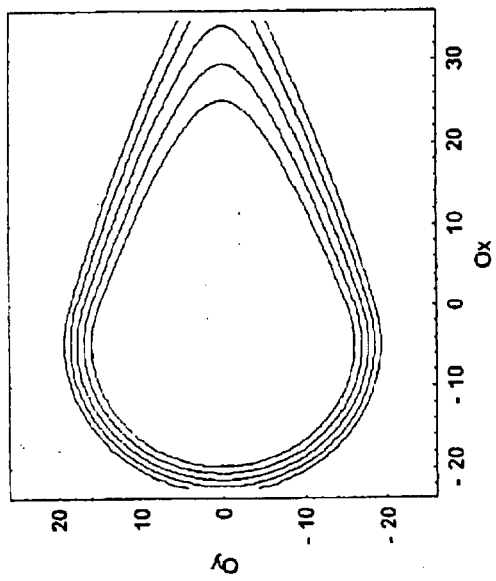
Figure 7A:
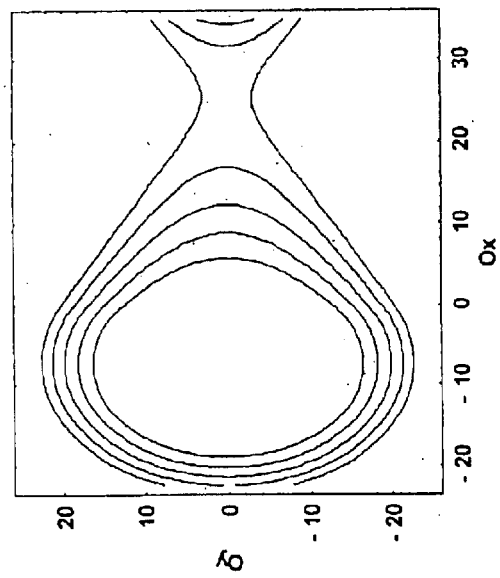
Figure 7B:
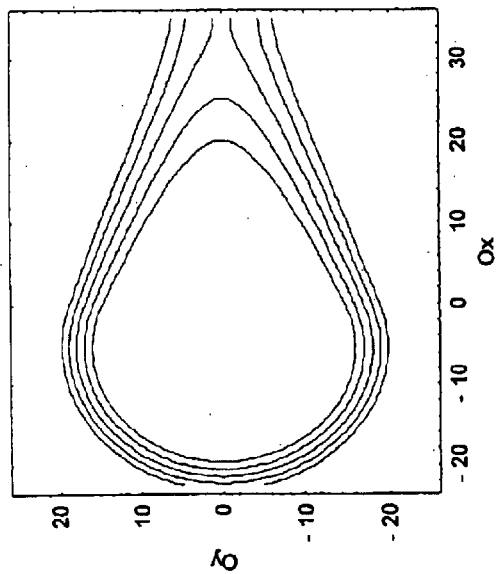

Consider the data of Table 3, which corresponds to the relatively flatter lens surface and frame datum points of Example 2. For $Z>0$, the frame carrier surface is again far more strongly curved in the horizontal direction than it is vertically ($A_3 >> A_4$). As Z becomes increasingly negative, the frame carrier surface tends toward a sphere and then subsequently assumes higher curvature vertically than horizontally. A complete intersection curve occurs for $Z \leq -0.5$ mm. The contours of FIGS. 7a, 7b and 7c correspond to Z values of −0.72, −1.296 and −1.5 mm respectively, while the curves of FIG. 7d show the relationship between the lens front surface and its shallowest external bounding surface, corresponding to FIG. 7b. Suitable outline shapes are again available. For this example, the shallowest external bounding surface is toroidal with major curvature oriented vertically. Its horizontal base curve is equal to 10.33 D, compared to the 11.3 D curve of the lens surface.

The details of the other characteristic surfaces defined by the aperture datum points and lens surface curvatures are also given in Table 3. Again, the spherical carrier surface intersects the optical design axis more closely to the lens front vertex than does the shallowest external bounding surface.

TABLE 3

Variation in frame carrier surface with changing intersection height Z for the lens of Example 2, having $A_0$ = 4.55 D, $A_1$ = 11.30 D and $A_2$ = 7.25 D.

| Surface Type | Z | α | β | γ | $\rho_1$ | $A_1$ | $\rho_4$ | $A_4$ |
|---|---|---|---|---|---|---|---|---|
| Set Point | 1.50 | −9.045 | 0 | 0.946 | 74.12 | 7.15 | 289.25 | 1.83 |
|  | 1.00 | −7.614 | 0 | 0.574 | 68.34 | 7.55 | 145.00 | 3.66 |
|  | 0.00 | −5.337 | 0 | −0.240 | 59.43 | 8.92 | 73.25 | 7.24 |
|  | −0.50 | −4.421 | 0 | −0.675 | 55.86 | 9.49 | 59.05 | 8.98 |
|  | −1.00 | −3.607 | 0 | −1.123 | 52.81 | 10.04 | 49.67 | 10.67 |
|  | −1.50 | −2.883 | 0 | −1.583 | 50.16 | 10.57 | 43.04 | 12.31 |
| Lens Properties: |  |  |  |  |  |  |  |  |
| Internal Bound | 1.266 | −8.343 | 0 | 0.776 | 71.33 | 7.43 | 197.13 | 2.69 |
| Mean Slope | 0.541 | −6.488 | 0 | 0.212 | 63.92 | 7.92 | 99.85 | 5.31 |
| Mean Height | 0.000 | 5.337 | 0 | −0.240 | 59.43 | 8.92 | 73.25 | 7.24 |
| External Bound | −1.286 | −3.177 | 0 | −1.385 | 51.28 | 10.33 | 45.61 | 11.62 |
| Sphere | −0.719 | −4.048 | 0 | −0.869 | 54.51 | 9.73 | 54.51 | 9.73 |

Example 5

FIG. 8

Figure 8A:
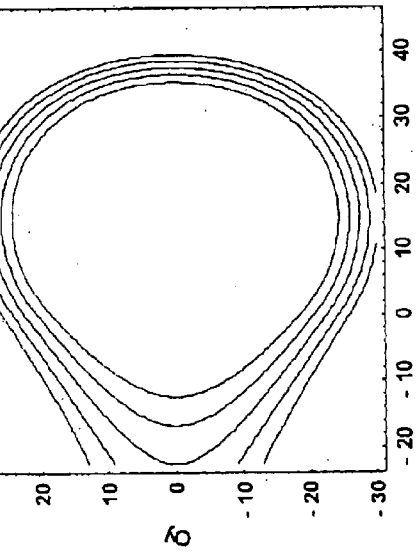
FIG. 8 depicts the sequential changes occurring to the intersection geometry at a lens surface suited to a wide and relatively shallow wrap-around frame aperture, as the frame carrier surface is chosen to locate at various distances rearward and forward of the lens front vertex.
Figure 8B:
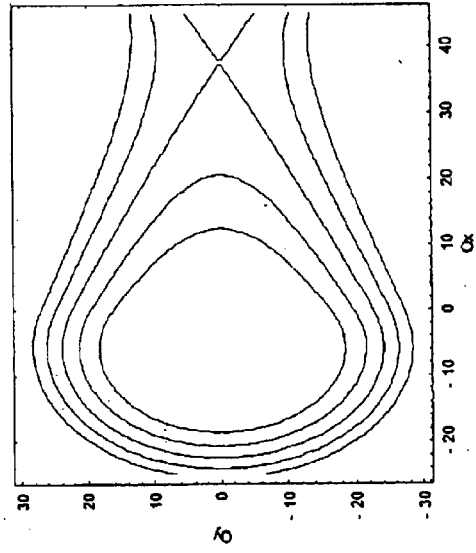
Figure 8C:
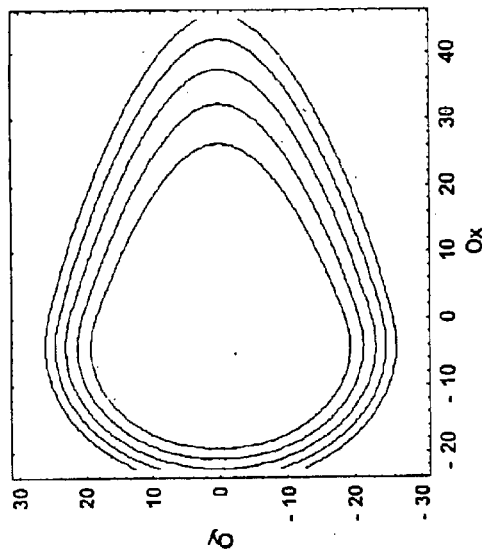
Figure 8D:
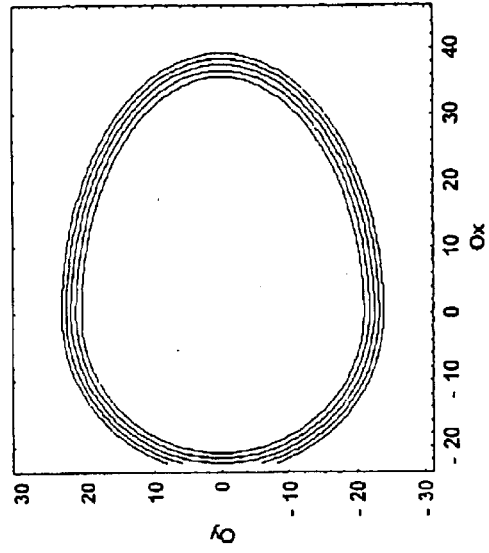
Figure 9B:
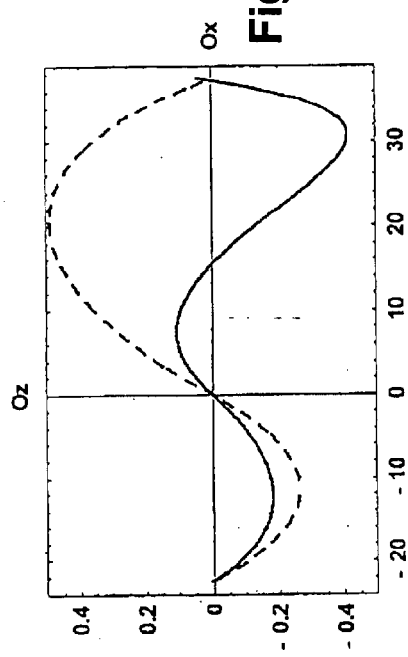
FIG. 9 depicts the changes occurring to the intersection geometry when an ellipsoidal frame carrier surface is used in conjunction with the lens of FIG. 8.
Figure 9D:
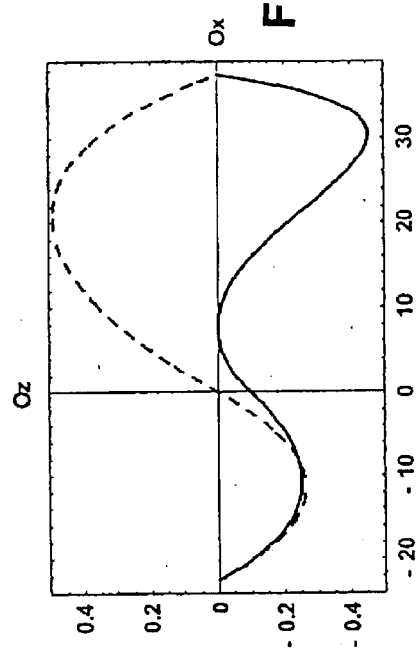
Figure 9A:
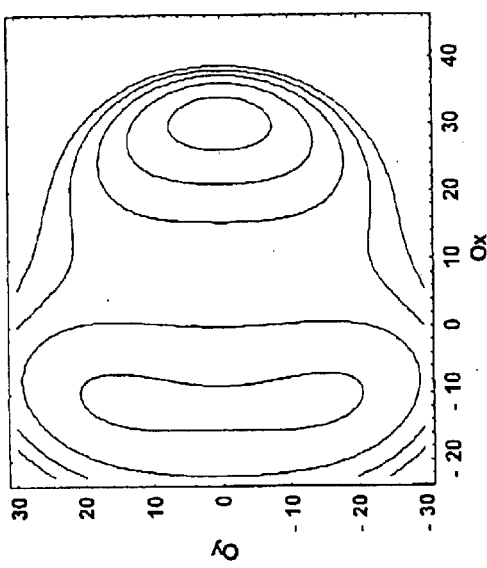
Figure 9C:
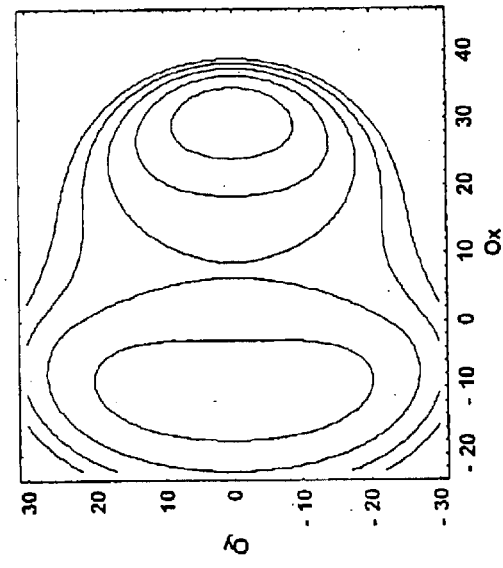
Figure 10B:
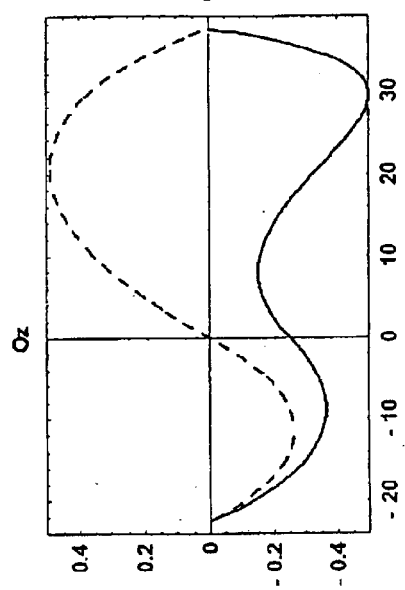
FIG. 10 depicts the changes occurring to the intersection geometry when an ellipsoidal frame carrier surface is used in conjunction with the lens of FIG. 8.
Figure 10D:
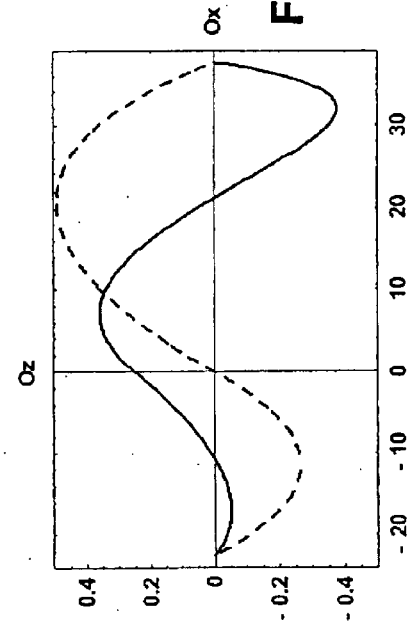
Figure 10A:
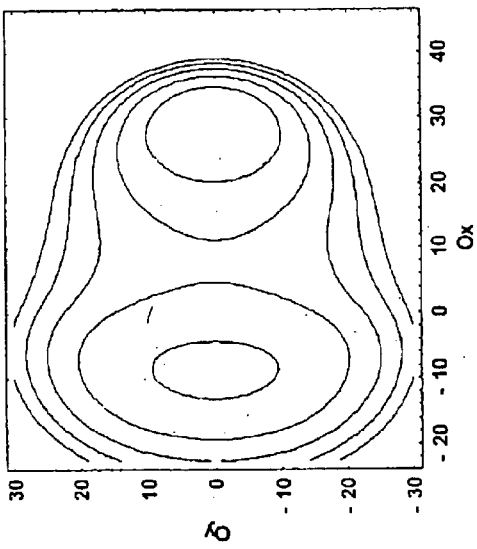
Figure 10C:
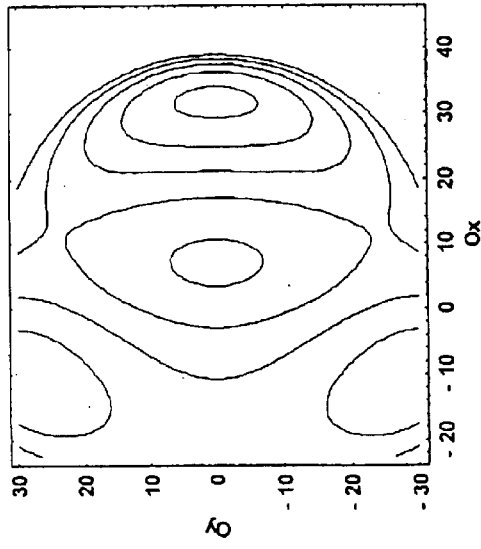

Consider a still flatter lens surface suiting frame datum points (−22.5, 0, 2.5), (37.5, 0, 12.5) and (0, ±22.5, 2.5), wherein the base curvatures are 5.17 D nasally, 8.48 D temporally and 5.17 D vertically. This relatively flat lens has a 10 mm sagittal depth and a 3D horizontal curvature change. Because of this and the vertical curvature, the lens achieves wrap-around and eyelash clearance. Nevertheless, the same sequential changes in available outline shapes are evident as the intersection height Z is varied from positive to negative values. The contours in FIG. 8 depict a sequence of changes: FIG. 8a, Z=+1.0; FIG. 8b, Z=−0.68; FIG. 8c, Z=−1.0 and; FIG. 8d, Z=−2.329. A spherical carrier surface occurs at Z=−2.329 mm, whilst the shallowest external bounding surface occurs at Z=−0.68. It has major curvature of 8.02 D directed horizontally, with vertical curvature 6.53D.

TABLE 4

Variation in frame carrier surface with changing intersection height Z for the lens of Example 5, having the following curvatures:
SET A; $A_0$ = 5.17 D, $A_1$ = 8.48 D and $A_2$ = 5.17 D,
SET B; $A_0$ = 5.17 D, $A_1$ = 8.48 D and $A_2$ = 2.09 D,
SET C; $A_0$ = 5.17 D, $A_1$ = 11.30 D and $A_2$ = 5.17 D, and
SET D; $A_0$ = 5.17 D, $A_1$ = 8.48 D and $A_2$ = 6.71 D.

| Surface Type | Z | α | β | γ | $\rho_1$ | $A_1$ | $\rho_4$ | $A_4$ |
|---|---|---|---|---|---|---|---|---|
| SET A |  |  |  |  |  |  |  |  |
| Internal Bound | 0.674 | −4.787 | 0 | 0.532 | 80.69 | 6.57 | 139.54 | 9.80 |
| Mean Slope | 0.164 | −3.659 | 0 | 0.074 | 74.38 | 7.13 | 109.52 | 4.84 |
| Mean Height | 0.000 | −3.333 | 0 | −0.076 | 72.58 | 7.30 | 102.50 | 5.17 |
| External Bound | −0.679 | −2.143 | 0 | −0.714 | 66.07 | 8.02 | 81.20 | 6.53 |
| Sphere | −2.329 | 0.000 | 0 | −2.329 | 54.83 | 9.67 | 54.83 | 9.67 |
| SET B |  |  |  |  |  |  |  |  |
| Internal Bound | .674 | −4.787 | 0 | 0.532 | 80.69 | 6.57 | 776.73 | 0.682 |
| Mean Slope | 0.164 | −3.659 | 0 | 0.074 | 74.38 | 7.13 | 303.19 | 1.75 |
| Mean Height | 0.000 | −3.333 | 0 | −0.076 | 72.58 | 7.30 | 253.62 | 2.09 |
| External Bound | −0.679 | −2.143 | 0 | −0.714 | 66.07 | 8.02 | 151.55 | 3.50 |
| Sphere | −5.283 | 2.403 | 0 | −5.349 | 43.49 | 12.20 | 43.49 | 12.20 |
| SET C |  |  |  |  |  |  |  |  |
| Internal Bound | 1.345 | −7.888 | 0 | 0.876 | 66.56 | 7.96 | 219.82 | 2.41 |
| Mean Slope | 0.505 | −6.015 | 0 | 0.204 | 60.32 | 8.79 | 127.86 | 4.15 |
| Mean Height | 0.000 | −5.057 | 0 | −0.224 | 57.21 | 9.26 | 102.50 | 5.17 |
| External Bound | −1.370 | −2.908 | 0 | −1.454 | 50.51 | 10.49 | 67.33 | 7.87 |
| Sphere | −3.981 | 0.000 | 0 | −3.981 | 42.30 | 12.53 | 42.30 | 12.53 |
| SET D |  |  |  |  |  |  |  |  |
| Internal Bound | .674 | −4.787 | 0 | 0.532 | 80.69 | 6.57 | 98.81 | 5.36 |
| Mean Slope | 0.164 | −3.659 | 0 | 0.074 | 74.38 | 7.13 | 83.05 | 6.38 |
| Mean Height | 0.000 | −3.333 | 0 | −0.076 | 72.58 | 7.30 | 79.04 | 6.71 |
| External Bound | −0.679 | −2.143 | 0 | −0.714 | 66.07 | 8.02 | 66.07 | 8.02 |
| Sphere | −0.078 | −2.144 | 0 | −0.713 | 66.08 | 8.02 | 66.08 | 8.02 |

In this Example, the spherical frame carrier surface is located further from the lens front vertex than is the shallowest external bounding surface. See the data set A in Table 4. If the lens is flattened nasally to intersect aperture datum points (0, ±22.5, 1.0), the data set B of Table 4 applies. The spherical frame carrier surface is further distant and the shallowest external bounding surface is flattened further nasally. If the temporal curvature is increased as for example having a temporal aperture datum (37.5, 0, 18.75) per the data set C in Table 4, the spherical carrier continues to be more distant from the lens front vertex than the shallowest external bounding surface. Finally, if the lens nasal curvature is increased to 6.71 D or greater, the spherical carrier surface locates at the shallowest external bounding surface or closer to the lens front vertex. This surface would suit vertical aperture datum points (0, ±17.7, 2), which are quite reasonable.

Thus, it may be seen that, for lenses of the form of Examples 1 to 5 above, the shallowest external bounding surface of a lens will be a toroid with major curvature directed horizontally when the vertical curvature of the lens front surface equals or is less than its nasal curvature. When the vertical curvature of the lens surface exceeds its nasal curvature by a required amount, the major curvature of the toroidal bounding surface will be directed vertically.

Example 6

FIGS. 9 and 10

It would be desirable to have more direct control over the available aperture outlines than indicated by the foregoing examples. To specify the frame carrier surface, we need to stipulate four aperture datum points and one other condition. That other condition may be a further point of the desired lens periphery. However, such an approach results always in very steep frame surfaces that intersect the lens front surface at a high inclination, a result judged undesirable because it introduces very tight tolerances along the lens perimeter rather providing greater freedom. It seems, therefore that a further degree of freedom is required, but one preserving mathematical simplicity of the frame carrier surfaces. Ellipsoidal topography is somewhat similar to toroidal topography and is equally useful in defining frame carrier surfaces for lenses of compound design. These surfaces are described by a general equation of the form $$\frac{(Z-\gamma)^2}{\rho_Z^2} = 1 - \frac{(x-\alpha)^2}{\rho_X^2} - \frac{(y-\beta)^2}{\rho_Y^2}$$

or, $$Z = \gamma + \sqrt{\rho_Z^2 - \frac{\rho_Z^2}{\rho_X^2}(x-\alpha)^2 - \frac{\rho_Z^2}{\rho_Y^2}(y-\beta)^2}$$

and include special forms defined when the semi-major axes $\rho_X$, $\rho_Y$, $\rho_Z$ have particular relationships: a spheroid is defined when any two semi-major axes are equal; a sphere occurs when all three are equal, and; circular or elliptical cylinders are formed when one semi-major axis is infinite. Ellipsoidal surfaces have one additional degree of freedom compared to toroidal surfaces.

A useful procedure for determining a suitable ellipsoidal frame carrier surface is to specify the four frame datum points used with toroidal frames plus a fifth point on the perimeter curve approximately mid way between the lens front vertex and the temporal limit. Such a point might be located at x=22, for example, in the aperture depicted by FIG. 8c. The sixth defining condition is best associated with a region of the frame carrier surface well away from the perimeter curve. The intersection point (0, 0, Z) at the optical design axis is a suitable parameter to use.

TABLE 5

Variation in ellipsoidal frame carrier surface with height Z for the lens of Example 5, having $A_0 = 5.17$ D, $A_1 = 8.48$ D and $A_2 = 5.17$ D.

| Set Point | | | | $\rho_Z/\rho_X$ | $\rho_Z/\rho_Y$ | $\rho_Z$ |
|---|---|---|---|---|---|---|
| (22, 18, 5.66) | 0.50 | −3.274 | 0 | 0.443 | 0.49 | 0.41 | 22.51 |
| | 0.25 | −2.803 | 0 | 0.206 | 0.52 | 0.45 | 24.01 |
| | 0.1 | −2.548 | 0 | 0.062 | 0.54 | 0.47 | 24.99 |
| | 0.0 | −2.388 | 0 | −0.034 | 0.55 | 0.49 | 25.68 |
| | −0.1 | −2.235 | 0 | −0.130 | 0.57 | 0.52 | 26.40 |
| | −0.25 | −2.019 | 0 | −0.276 | 0.59 | 0.53 | 27.54 |
| | −0.5 | −1.689 | 0 | −0.519 | 0.63 | 0.58 | 29.64 |
| (22, 14, 5.00) | 0.50 | −3.206 | 0 | 0.446 | 0.48 | 0.40 | 21.73 |
| | 0.00 | −2.541 | 0 | −0.039 | 0.59 | 0.52 | 28.30 |
| | −0.50 | −2.047 | 0 | −0.529 | 0.74 | 0.67 | 39.75 |

When a frame carrier surface corresponding to FIG. 8c is determined in this way, significantly different contours of surface height difference are obtained. The available frame outline shapes are much more generous, especially along the limits at the cheeks and eyebrows.

It is found in addition, that surfaces passing through or falling close to the lens front vertex allow a complete intersection path with the lens surface. Such was not possible with toroidal carrier surfaces. For this example, the available aperture outline shapes show the unwanted nasal tapering effect when Z≧+0.5 mm, while those for Z≦−0.5 mm are tapered in the temporal direction as desired. However, there is no abrupt demarcation between the characteristically different groups.

The transitional effect can be seen from FIGS. 9 and 10. FIG. 9a shows height difference contours for Z=0.0 and FIG. 9b plots the height difference Z(x)−F(x) along Ox for the lens front surface and the frame carrier surface (solid line). The dashed line represents the height difference between lens front and the lens mean height surface. Negative values mean that the respective surface is located forward of the lens front surface. At Z=0, then, the ellipsoidal frame carrier surface is in front of the lens front surface over most of the lens aperture, while the lens mean height surface is not. When Z=−0.1 mm, the frame carrier surface is forward of the lens front surface (FIGS. 9c and 9d), and at Z=−0.25 mm the frame carrier surface is well forward of the lens front surface (FIGS. 10a and 10b). On the other hand, the frame carrier surface is substantially rearward of the lens front surface when Z=+0.25 mm and the surface height contours are disposed to cause nasal tapering of the aperture outline (FIGS. 10c and 10d).

Desired aperture outline shapes are obtained if the ellipsoidal frame carrier surface is always forward of the lens mean height surface in that part of the frame aperture between the lens front vertex and the temporal limit.

For this representation of the frame carrier surface, the designer has the option of placing the lens front vertex on the frame carrier surface as well as rearward of it. Given that it is always necessary to have the freedom of including lenses whose front surfaces are modified as necessary to suit the optical requirements of a range of Rx values, such location of the lens front vertex should be adopted only for the lens examples with greatest vertex height relative to the chosen aperture.

Example 7

FIGS. 11 to 14

Figure 11A:
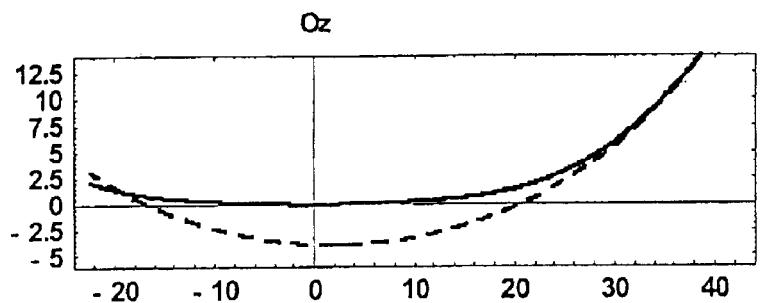
FIG. 11 depicts the intersection of a spherical frame of 11.5 D curvature with a rotationally symmetric wrap around sunlens that has a central 2.5 Base spherical zone blended smoothly to a spherical 10.0 Base temporal region. The vertex of the frame carrier surface is decentered both vertically and horizontally, while itself being forward of the lens front surface over most of the lens aperture.
Figure 11B:
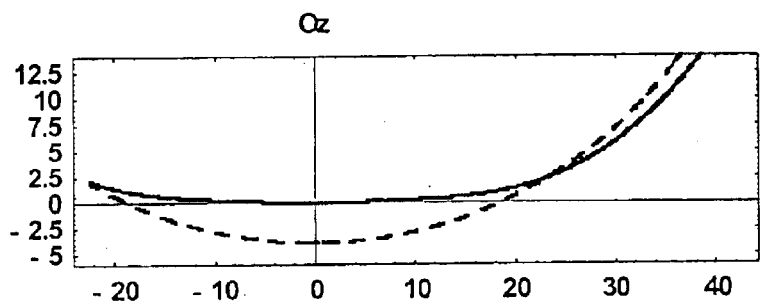

Consider the lens surface depicted by the solid curves in FIGS. 11a and 11b. It has a rotationally symmetric central vertex region of base curve 2.5 D blended smoothly to an outer region of base curve 10 D that forms the temporal region, reaching well back from the vertex. The dashed curves depict the horizontal and vertical sections of a decentered 11 Base spherical frame carrier surface positioned forward of the lens surface across the lens aperture to be the shallowest external bounding surface. The outline of true intersection between the surfaces is shown as FIG. 11c. This outline is ovaline with a large central field and a discernable taper to the temporal side.

Figure 12A:
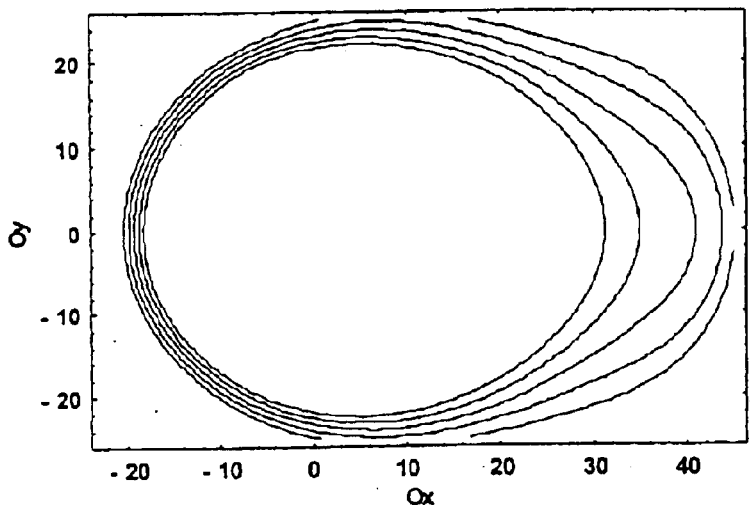
FIG. 12 depicts suitable lens aperture outline and frame eye wire shapes for the lens of FIG. 11.
Figure 12B:
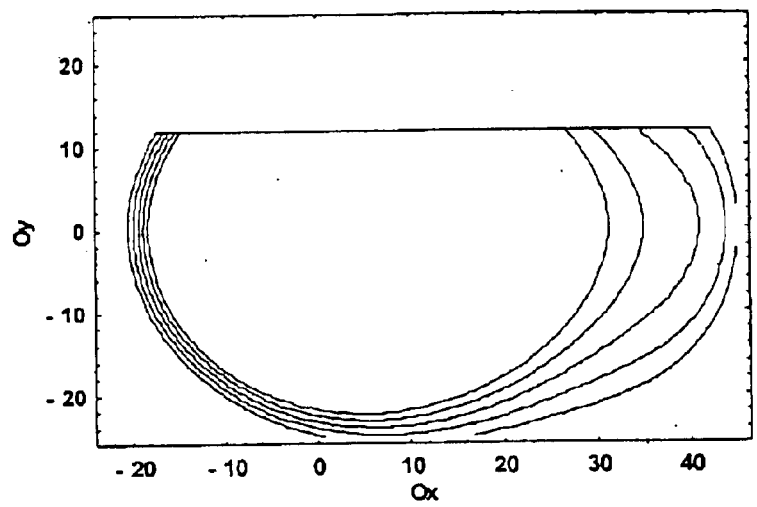

When a tolerance of ±0.5 mm is allowed for the proximity of the frame carrier and the lens front surfaces, the corresponding field available for the lens aperture outline broadens generally, but especially so in the temporal region, as shown in FIG. 12a. This field is conveniently located for a lower aperture outline across the wearer's cheeks, but reaches too far upward in the brow region. Thus it is appropriate to cut away an upper part of the lens, say more than 12 mm above the wearer's horizon, as depicted in FIG. 12b. This provides the opportunity to glaze the lens to an aperture of the form shown in FIG. 12c. In this case, the lower edge and both the nasal and temporal sides are retained by a rimmed portion or eye wire formed to the 11.5 Base spherical frame carrier surface. The upper edge is rimless, following a desired curve across the lens surface. Thus, the frames engage the lenses along at least a major portion of a peripheral edge of each lens.

Figure 12C:
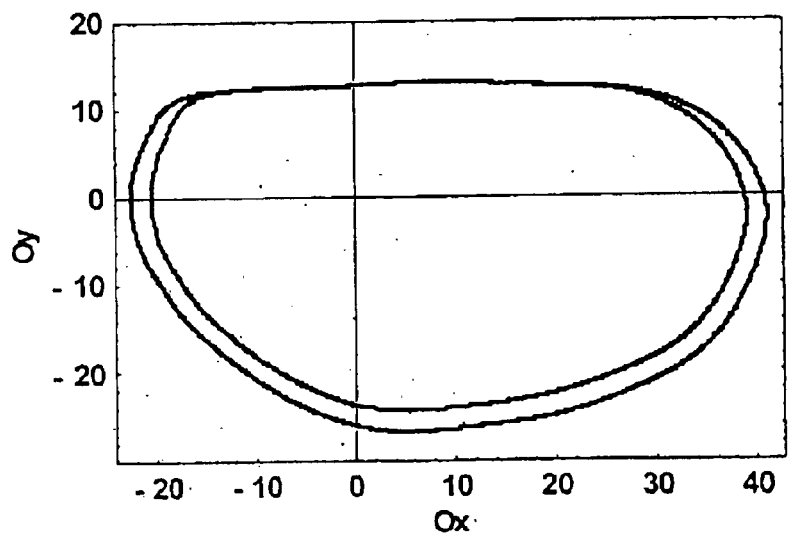
Figure 13A:
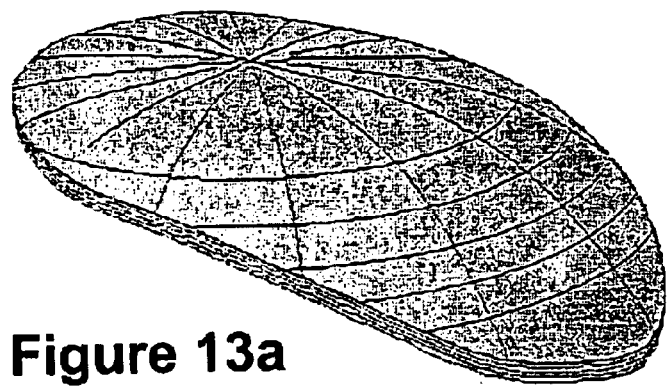
FIG. 13 shows perspective views of a lens of FIG. 11 when edged to fit the frame configuration depicted in FIG. 12.
Figure 13B:
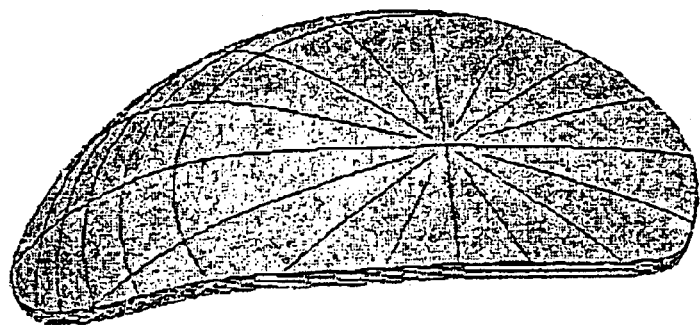
Figure 13C:
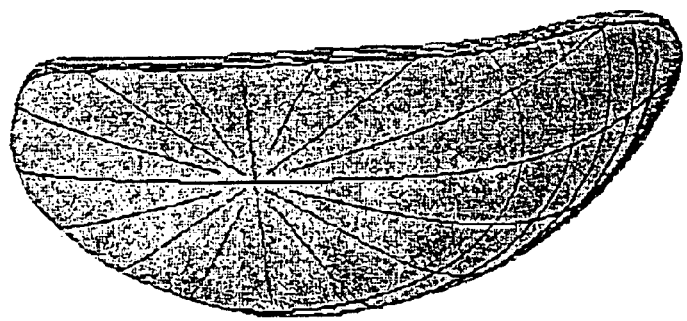

The surface topography of lenses edged to suit the aperture outline of FIG. 12c is shown from various perspectives in FIGS. 13a, 13b and 13c.

Figure 11C:
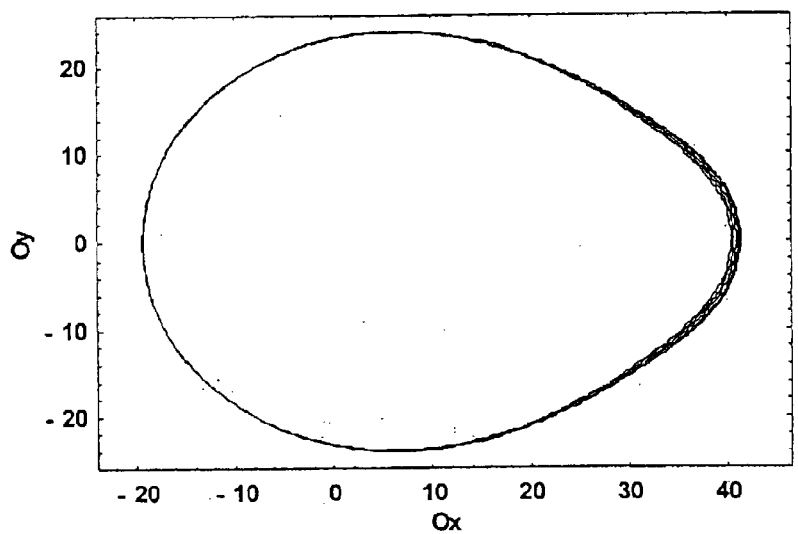
Figure 14A:
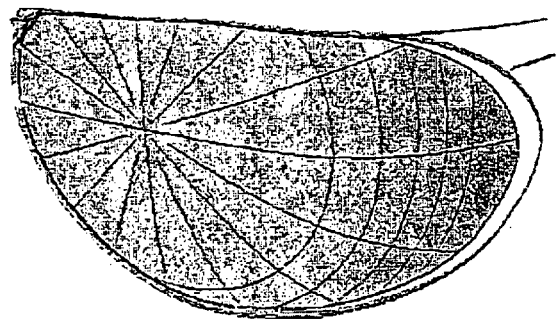
FIG. 14 shows perspective views of the lens and frame according to FIGS. 11 to 13.
Figure 14B:
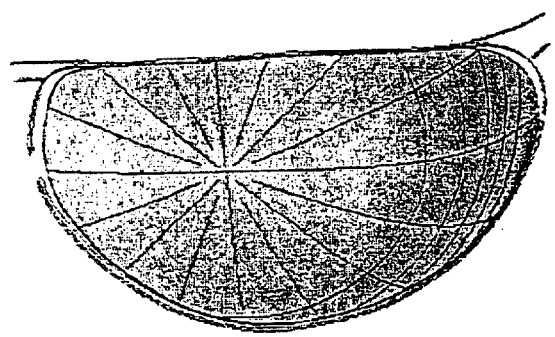
Figure 14C:
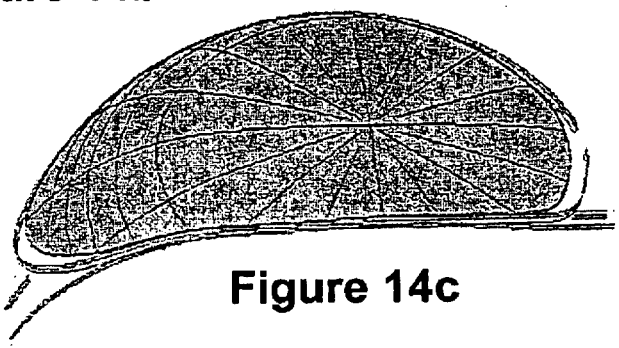

FIGS. 14a, 14b and 14c represent lenses glazed to the rim depicted in FIG. 11c. The rim is itself supported on a temple bar that follows the upper edge of the lens across from the temporal region to the region of the nasal bridge, whereupon it continues laterally to meet the opposing rim and lens. The length of the segment of temple bar between the pair of lenses defines the spacing of the lens optical axes when glazed. It is thus an important variable in matching the locations of the lens optical axes to the wearer's interpupillary distance.

Example 8

FIGS. 15 to 17

Figure 15A:
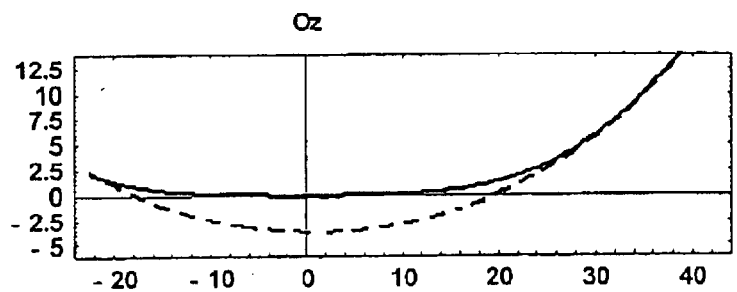
FIG. 15 depicts the intersection of a lens, having a central 1.0 Base spherical section blended smoothly to a temporal 10.0 D spherical section, with an 11.75 Base ellipsoidal frame carrier surface. A suitable lens aperture outline and frame outline shape for glazing the lens is proposed.

Consider the lens surface depicted by the solid curve in FIG. 15a. It is rotationally symmetric with a central vertex region of base curve 1.0 D blended smoothly to an outer region of base curve 10 D that forms the temporal region, reaching well back from the vertex. The dashed curve depicts the horizontal sections of a decentered oblate ellipsoidal frame carrier surface positioned forward of the lens surface across the lens aperture. The carrier surface has constant vertical curvature of 11.75D and its horizontal vertex curvature is 11.15 D.

Figure 15B:
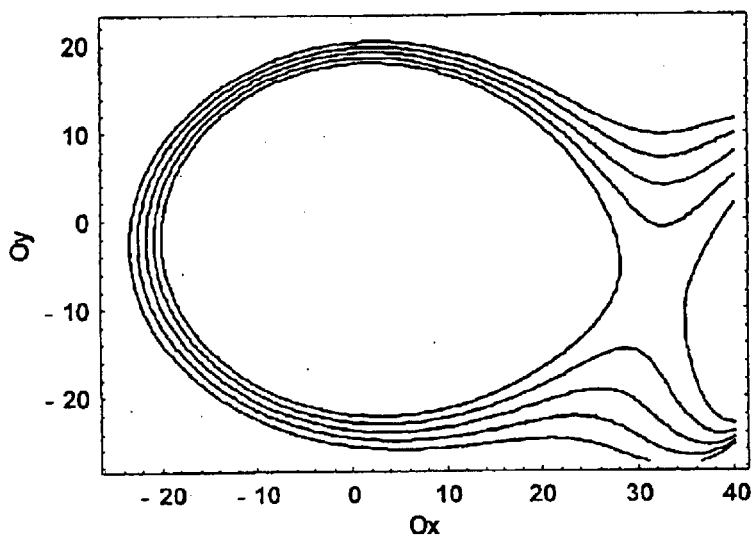

The contours of FIG. 15b show the area in which the lens aperture may be placed, according to the tolerances used before. This gives reasonable design freedom nasally, at the cheek line and the brows. Most significantly, it allows very substantial design freedom in the temporal region. A lens aperture and frame outline shape of the form given in FIG. 15c may be used, for example. For such a frame aperture outline the cut lenses are fully supported around their edge.

Figure 16A:
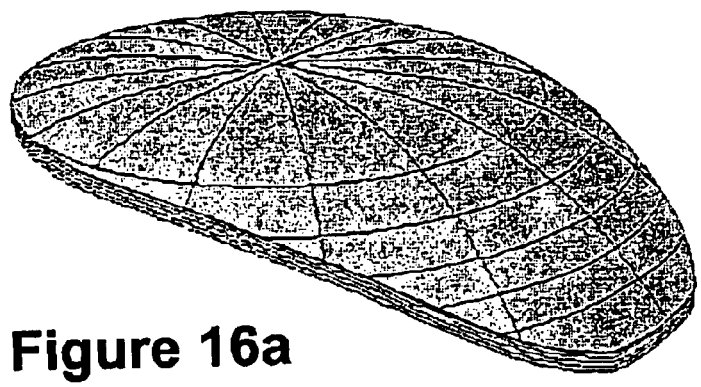
FIG. 16 shows a lens edged to fit the frame configuration depicted in FIG. 15.
Figure 16B:
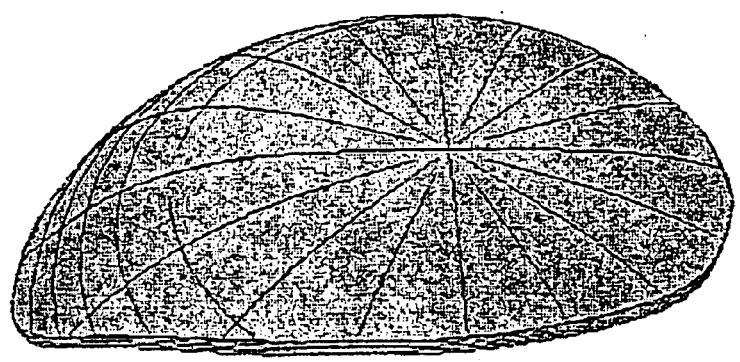
Figure 16C:
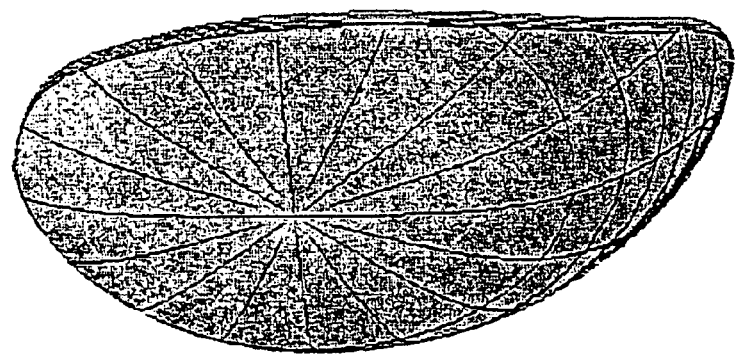

The surface topography of such edged lenses is shown from various perspectives in FIGS. 16a, 16b and 16c.

Figure 17A:
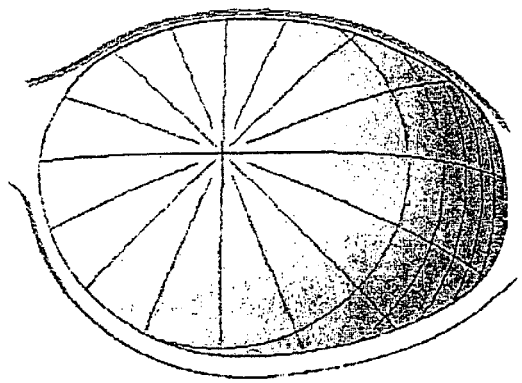
FIG. 17 shows perspective views of the lens and frame of FIGS. 15 and 16.
Figure 17B:
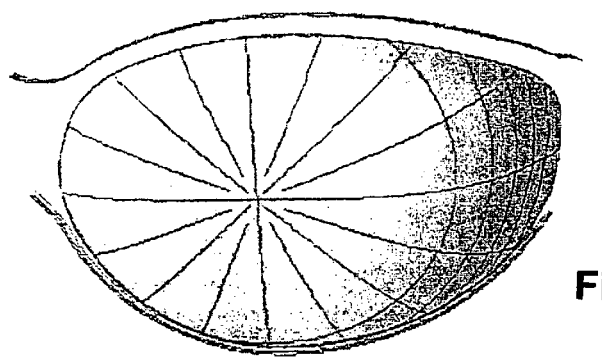
Figure 17C:
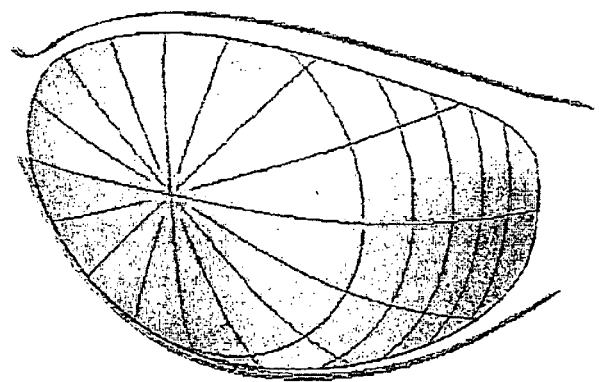

FIGS. 17a, 17b and 17c represent lenses glazed to the frame depicted in FIG. 11c. The frame is generally similar in appearance to many popular styles of wrap around sunglasses to which 8 or 9 Base lenses are fitted. However, the combined appearance of the present lenses and frames is quite distinctive. FIGS. 17a, 17b and 17c show clearly that the lens surfaces are equally significant to the cosmetics of the resultant eyewear as is the frame.

Finally, note that the nose pad for wrap around frames is frequently integral to the frame structure where this intersects the lower nasal part of the lens. When present, such an integral pad adds substantial local depth to the frame wall. Such frame designs therefore provide the opportunity to truncate the lens aperture shape locally in order to create a desired shape around the nasal region whilst still retaining the lens edge fully. Although the lens edge would follow a desired curve on the lens surface rather than the carrier surface of the frame design in such designs, the edge would continue to present against the wall created when including the nasal pad into the frame structure.

Example 9

Consider the lens of Example 7. It has a rotationally symmetric central front vertex region of base curve 2.5 D blended smoothly to an outer region of base curve 10 D. The frame aperture outline shown in the Example is formed on a decentered 11 D spherical frame carrier surface. On combination with a suitable back surface form, this front surface design would allow prescription corrections of generally negative power. Higher curves would be required in the area of the forward visual field in particular to allow a plus range of prescriptions. It would be particularly desirable for such modifications of front surface form to be accommodated in a frame of single design throughout the Rx range. The selection of frame aperture was carried out assuming just one surface form and allowing the difference in surface heights along the lens perimeter curve to vary in a tolerance of ±0.5 mm. In order for it to be possible for similar surfaces of higher front vertex curvature to be employed, the difference in surface heights along the perimeter curve must fall within acceptable tolerances for the new surfaces also.

TABLE 6

Variation of the height difference between the frame aperture outline of FIG. 12c and three related lens surfaces of different vertex curvature.

| | $F_U$-$Z_U$ | | | $F_L$-$Z_L$ | | |
|---|---|---|---|---|---|---|
| X | $A_0 = 0.5$ | $A_0 = 2.5$ | $A_0 = 6.5$ | $A_0 = 0.5$ | $A_0 = 2.5$ | $A_0 = 6.5$ |
| −17.50 | 0.26 | 0.11 | 0.02 | 0.21 | 0.06 | −0.03 |
| −15.00 | −0.13 | −0.29 | −0.41 | 0.12 | −0.02 | −0.11 |
| −12.50 | −0.65 | −0.82 | −0.98 | 0.05 | −0.09 | −0.18 |
| −10.00 | −1.15 | −1.34 | −1.51 | 0.03 | −0.10 | −0.18 |
| −7.50 | −1.60 | −1.79 | −1.97 | 0.06 | −0.06 | −0.12 |

TABLE 6-continued

Variation of the height difference between the frame aperture outline of FIG. 12c and three related lens surfaces of different vertex curvature.

| | $F_U-Z_U$ | | | $F_L-Z_L$ | | |
|---|---|---|---|---|---|---|
| X | $A_0 = 0.5$ | $A_0 = 2.5$ | $A_0 = 6.5$ | $A_0 = 0.5$ | $A_0 = 2.5$ | $A_0 = 6.5$ |
| −5.00 | −1.97 | −2.16 | −2.34 | 0.11 | −0.01 | −0.05 |
| −2.50 | −2.24 | −2.42 | −2.59 | 0.16 | 0.05 | 0.03 |
| 0.00 | −2.38 | −2.56 | −2.73 | 0.19 | 0.10 | 0.10 |
| 2.50 | −2.41 | −2.59 | −2.77 | 0.19 | 0.10 | 0.11 |
| 5.00 | −2.33 | −2.52 | −2.70 | 0.16 | 0.08 | 0.11 |
| 7.50 | −2.16 | −2.35 | −2.54 | 0.13 | 0.05 | 0.09 |
| 10.00 | −1.94 | −2.12 | −2.30 | 0.11 | 0.04 | 0.09 |
| 12.50 | −1.68 | −1.85 | −1.99 | 0.12 | 0.05 | 0.12 |
| 15.00 | −1.40 | −1.54 | −1.64 | 0.14 | 0.08 | 0.16 |
| 17.50 | −1.10 | −1.22 | −1.28 | 0.16 | 0.11 | 0.21 |
| 20.00 | −0.82 | −0.92 | −0.92 | 0.18 | 0.14 | 0.25 |
| 22.50 | −0.57 | −0.65 | −0.60 | 0.19 | 0.15 | 0.28 |
| 25.00 | −0.38 | −0.43 | −0.35 | 0.19 | 0.16 | 0.30 |
| 27.50 | −0.24 | −0.28 | −0.17 | 0.18 | 0.16 | 0.31 |
| 30.00 | −0.15 | −0.18 | −0.05 | 0.17 | 0.15 | 0.31 |
| 32.50 | −0.10 | −0.12 | 0.03 | 0.14 | 0.13 | 0.29 |
| Set Level | 0.00 | 0.00 | −0.20 | 0.00 | 0.00 | −0.20 |

The data in Table 6 show the variation of surface height differences along the upper (U) and lower (L) portions of the lens perimeter for three related surfaces having vertex curvatures; $A_0$ of 0.5, 2.5 and 6.5 D. Note that the upper portion of the aperture from −14 mm to +27 mm horizontal dimension (X) is rimless. It is remarkable how little variation in surface height differences occurs in the rimmed portion of the frame aperture.

There is accordingly substantial freedom to complete a range of Rx values and retain the corresponding lenses in a frame of common design.

TABLE 7

Figure 15C:
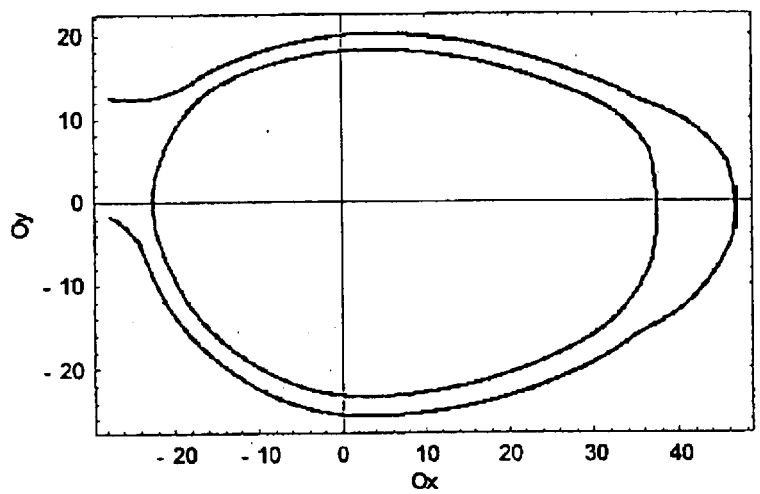

Variation of the height difference between the frame aperture outline of FIG. 15c and three related lens surfaces of different vertex curvature.

| | $F_U-Z_U$ | | | $F_L-Z_L$ | | |
|---|---|---|---|---|---|---|
| X | $A_0 = 0.1$ | $A_0 = 1.0$ | $A_0 = 4.0$ | $A_0 = 0.1$ | $A_0 = 1.0$ | $A_0 = 4.0$ |
| −17.50 | −0.14 | −0.01 | 0.48 | −0.51 | −0.39 | 0.09 |
| −15.00 | −0.01 | 0.12 | 0.61 | −0.43 | −0.32 | 0.11 |
| −12.50 | −0.03 | 0.11 | 0.63 | −0.35 | −0.25 | 0.14 |
| −10.00 | −0.10 | 0.05 | 0.60 | −0.28 | −0.19 | 0.16 |
| −7.50 | −0.16 | −0.01 | 0.57 | −0.20 | −0.13 | 0.19 |
| −5.00 | −0.20 | −0.04 | 0.55 | −0.14 | −0.07 | 0.21 |
| −2.50 | −0.21 | −0.05 | 0.54 | −0.11 | −0.05 | 0.21 |
| 0.00 | −0.20 | −0.05 | 0.53 | −0.10 | −0.05 | 0.19 |
| 2.50 | −0.18 | −0.03 | 0.52 | −0.11 | −0.06 | 0.15 |
| 5.00 | −0.14 | −0.01 | 0.51 | −0.13 | −0.08 | 0.11 |
| 7.50 | −0.09 | 0.04 | 0.51 | −0.14 | −0.10 | 0.06 |
| 10.00 | −0.01 | 0.10 | 0.51 | −0.14 | −0.11 | 0.02 |
| 12.50 | 0.08 | 0.16 | 0.51 | −0.13 | −0.12 | −0.03 |
| 15.00 | 0.16 | 0.22 | 0.50 | −0.12 | −0.12 | −0.08 |
| 17.50 | 0.23 | 0.27 | 0.46 | −0.12 | −0.13 | −0.14 |
| 20.00 | 0.29 | 0.31 | 0.42 | −0.12 | −0.15 | −0.21 |
| 22.50 | 0.34 | 0.33 | 0.35 | −0.14 | −0.18 | −0.29 |
| 25.00 | 0.36 | 0.33 | 0.26 | −0.16 | −0.22 | −0.38 |
| 27.50 | 0.34 | 0.28 | 0.14 | −0.21 | −0.28 | −0.48 |
| 30.00 | 0.23 | 0.16 | −0.05 | −0.27 | −0.35 | −0.59 |
| 32.50 | −0.14 | −0.22 | −0.47 | −0.27 | −0.36 | −0.61 |
| Set Level | 0.40 | 0.00 | −1.40 | 0.40 | 0.00 | −1.40 |

The intersection between two relatively larger spheres of radius of radii R and r is a circle of radius A when the centers are spaced apart by a distance D where $$D \approx (R-r)^2 - A^2 \left\{ 2 - \frac{r}{R} - \frac{R}{r} + \frac{A^2}{2rR} \right\}.$$

In order to maintain a constant aperture size as the radius of one sphere is changed, the spacing of the centers must be altered. It was not necessary to vary the front vertex position (Set Level) significantly for the series of surface changes summarized in Table 6, underscoring that the interaction between those lens surfaces and the spherical frame carrier surface was occurring primarily in the temporal region of the design.

For the lens surface and aperture of Example 8, however, it was necessary to alter the Set Level sequentially as the vertex curvature was altered. See Table 7. This follows from the frame carrier surface being ellipsoidal, on the one hand, and the lens perimeter curve intersecting surface regions influenced relatively strongly by the vertex curvature, on the other hand. A lesser range of vertex curvatures is available within a given tolerance for the range of surface height differences occurring along the perimeter curve. Consequently, a reduced range of Rx options is probable.

The height difference variation around the frame aperture varies for the chosen aperture with vertex curvature as;

| $A_0$ | 0.1 | 1.0 | 2.0 | 3.0 | 4.0 | 5.0 | 6.0 |
|---|---|---|---|---|---|---|---|
| $|Z-F|$ | 0.87 | 0.72 | 0.78 | 0.98 | 1.24 | 1.52 | 1.81 |

The higher vertex curvatures are appropriate to lenses of higher plus power, which are typically thin at the edges. Thus it is evident from the data that the frame aperture should be selected to match that front surface within a series that has greatest vertex curvature. In that case, the variation in height difference around the perimeter curve would increase with lower curvatures and, accordingly for surfaces intended to provide increasing minus lenses. Such lenses have thicker edges and can be matched to the frame at a wider tolerance.

The present invention has been described in connection with various embodiments and examples. However, the invention to be protected is defined by the following claims and equivalents thereof recognized in law.

We claim:

1. Spectacles comprising:
    a pair of lenses each of which
        exhibit a change in base curve across the field of vision of the wearer of at least 3D horizontally,
        have a sagittal depth at the horizontal temporal limit that is at least 10 mm greater than the sagittal depth at the horizontal nasal limit and
        have a front surface and a back surface which clears the temples and eyelashes of the wearer; and
    a frame having apertures for receiving said lenses,
    the frame apertures being generally ovaline in shape, enclosing the region of the wearer's eyes and tapering from regions of forward vision toward the temple, each aperture lying approximately on a generally monoformal carrier surface, such that all points on the front surfaces of the lenses lie at or behind the respective carrier surfaces.

2. The spectacles of claim 1 wherein the generally monoformal carrier surfaces are a spherical, toroidal, cylindrical or ellipsoidal carrier surface.

3. The spectacles according to claim 1 wherein the pair of lenses exhibit a change in base curve across the field of vision of the wearer of at least 2D vertically.

4. Spectacles comprising:
    a pair of lenses which exhibit a change in base curve across the field of vision of the wearer of at least 3D horizontally, each of which have a sagittal depth at the horizontal temporal limit that is at least 10 mm greater than the sagittal depth at the horizontal nasal limit and each of which have front surfaces and back surfaces which clear the temples and eyelashes of the wearer; and
    frames for engaging the lenses along at least a major portion of a peripheral edge of each lens;
    wherein edge-engaging portions of the frame lie within ±0.5 mm of an intersection of the front surface of each lens with a monoformal surface associated with each lens.

5. The spectacles of claim 4 wherein the monoformal surfaces are generally spherical, cylindrical or toroidal and are always more highly curved than a lens mean height surface of the respective lens.

6. The spectacles of claim 5 wherein each lens front vertex is positioned rearward of its respective monoformal surface.

7. The spectacles of claim 4 wherein a horizontal curvature of each lens has a maximum value of at least 12D.

8. A family of spectacles each having a pair of wrap-around lenses selected from a group of lenses having a range of prescription through powers, each lens of the group having a change of base curve of at least 3D across the field of vision of the wearer and a sagittal depth at the horizontal temporal limit that is at least 10 mm greater than the sagittal depth at the horizontal nasal limit, and frames with frame apertures of generally ovaline shape each lying approximately on a generally monoformal carrier surface, such that all points on each lens lie at or behind the carrier surfaces for its respective aperture.

9. The family of spectacles of claim 8 wherein the sagittal depth of each lens at the horizontal temporal limit is at least 15 mm greater than the sagittal depth at the horizontal nasal limit.

10. The family of spectacles of claim 8 wherein the range of through powers of the group of lenses is at least −6.0D to +6.0D.

11. Spectacle frames adapted for use with any pair of wrap-around lenses selected from a group of lenses providing various prescription corrections in the range of at least −4.0D to +4.0D, each lens having a change of base curve of at least 3 D across the field of vision of the wearer and a sagittal depth at the horizontal temporal limit that is at least 10 mm greater than the sagittal depth at the horizontal nasal limits, wherein the frames have rimmed apertures each having a shape which lies on a monoformal carrier surface defined such that the lenses may be mounted so that the vertex of the front surface of each of the selected lenses is located between the wearer and the carrier surface and the shape of which apertures does not vary with the prescription correction of the lenses selected.

12. A method of providing prescription eyewear comprising the steps of:
    providing lenses with front surfaces which have the same change of at least 3 D in horizontal curvature and the same maximum horizontal curvature of at least 12 D;
    configuring rear surfaces of a pair of the lenses so that the lens elements have a prescribed through power and a prescribed astigmatism correction; and
    engaging edges of the pair of the lenses in a frame having a generally ovaline shape apertures which taper from regions of forward vision toward the temple.

13. A method of providing frames for spectacle lenses which have a front surface with a horizontal change of curvature of at least 3 D and which have a sagittal depth at the horizontal temporal limit that is at least 10 mm greater than the sagittal depth at the horizontal nasal limit comprising:

defining monoformal carrier surfaces that intersect four datum points on the periphery of each lens front surface and a point on the lens optical design axis that is located forward of the lens front vertex, each carrier surface having substantially constant radii of curvature along the primary meridians; and making frames for engaging a pair of such lenses along at least a major portion of the periphery of each lens wherein the edge engaging portions of the frames lie within ±0.5 mm of an intersection of the front surface of each lens with its respective carrier surface.

14. The method of claim 13 wherein parameters describing the carrier surfaces are derived by solving five simultaneous equations for surface height.

15. The method of claim 13 wherein the carrier surfaces are defined so that each is generally spherical, cylindrical or toroidal and each is closely proximate the shallowest surface that bounds the respective lens front surface externally.

16. The method of claim 13 wherein a fifth datum point is defined located in a temporal area of the lens, wherein the carrier surfaces are defined so that each is generally ellipsoidal and wherein the parameters describing the carrier surfaces are derived by solving six simultaneous equations for surface height.

* * * * *